(12) United States Patent
Haneda et al.

(10) Patent No.: US 6,252,984 B1
(45) Date of Patent: *Jun. 26, 2001

(54) CHARACTER RECOGNITION DEVICE

(75) Inventors: Isamu Haneda, Soraku-gun; Toshio Isoe, Tenri, both of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,671

(22) Filed: Mar. 3, 1998

(30) Foreign Application Priority Data

Mar. 4, 1997 (JP) .................................................. 9-048334

(51) Int. Cl.⁷ ...................................................... G06K 9/00
(52) U.S. Cl. ............................................................ 382/181
(58) Field of Search ................................... 382/137, 170, 382/171, 172, 176, 178, 179, 181, 182, 184, 185, 193, 199, 200, 177, 201, 203, 206, 224, 229, 292

(56) References Cited

U.S. PATENT DOCUMENTS

| 4,741,045 | * | 4/1988 | Denning | 382/9 |
| 5,588,072 | * | 12/1996 | Wang | 382/176 |
| 5,655,031 | * | 8/1997 | Yukawa et al. | 382/194 |
| 5,729,630 | * | 3/1998 | Ikeda | 382/229 |

FOREIGN PATENT DOCUMENTS

| 0 634 704 A2 | 1/1995 | (EP) . |
| 0 678 822 A2 | 10/1995 | (EP) . |
| 62-80791 | 4/1987 | (JP) . |
| 6-74729 | 3/1994 | (JP) . |

* cited by examiner

*Primary Examiner*—Andrew W. Johns
*Assistant Examiner*—Seyed Azarian
(74) *Attorney, Agent, or Firm*—Nixon & Vanderhye P.C.

(57) ABSTRACT

A character recognition device which is provided with: a character cut-out section for cutting out a character from the character image that has been obtained by the CCD; a character-size storing section for storing at least one character size among character sizes required for recognition each of which is set for each of character types that can be recognized by the recognizing section; a size-judging section for comparing the size of the character that has been cut out by the character cut-out section with at least one of character sizes that have been stored in the character-size storing section; and, for example, a display section that serves as informing means for informing information corresponding to results obtained by comparing the size of the character that has been cut out by the character cut-out section with at least one of character sizes that have been stored in the character-size storing section by using the size-judging section. Before a character in the character image obtained by the CCD is recognized by the recognition section, it is possible to make a judgment as to whether or not the character is recognizable.

15 Claims, 18 Drawing Sheets

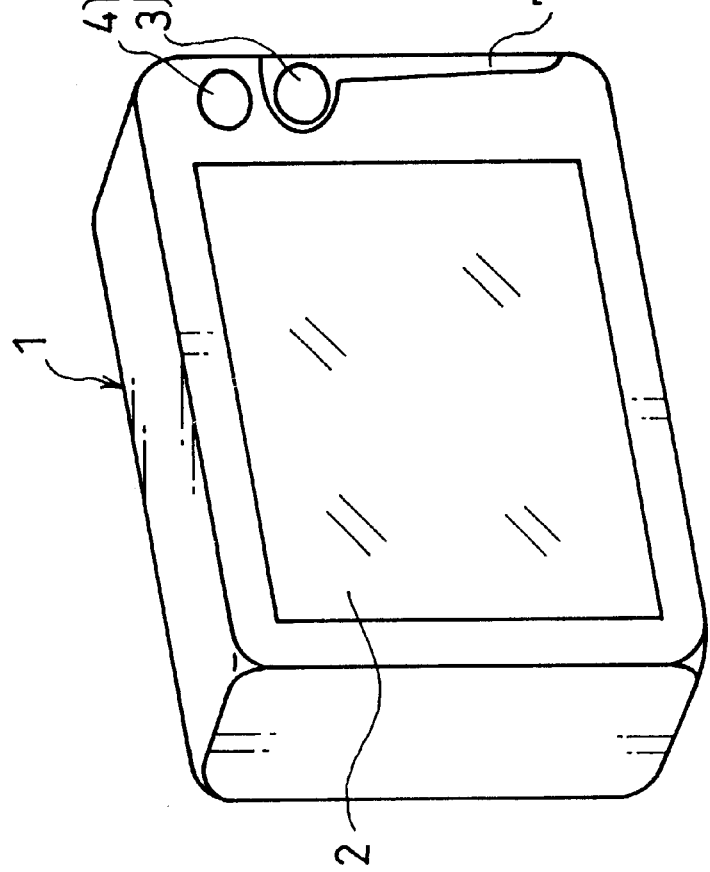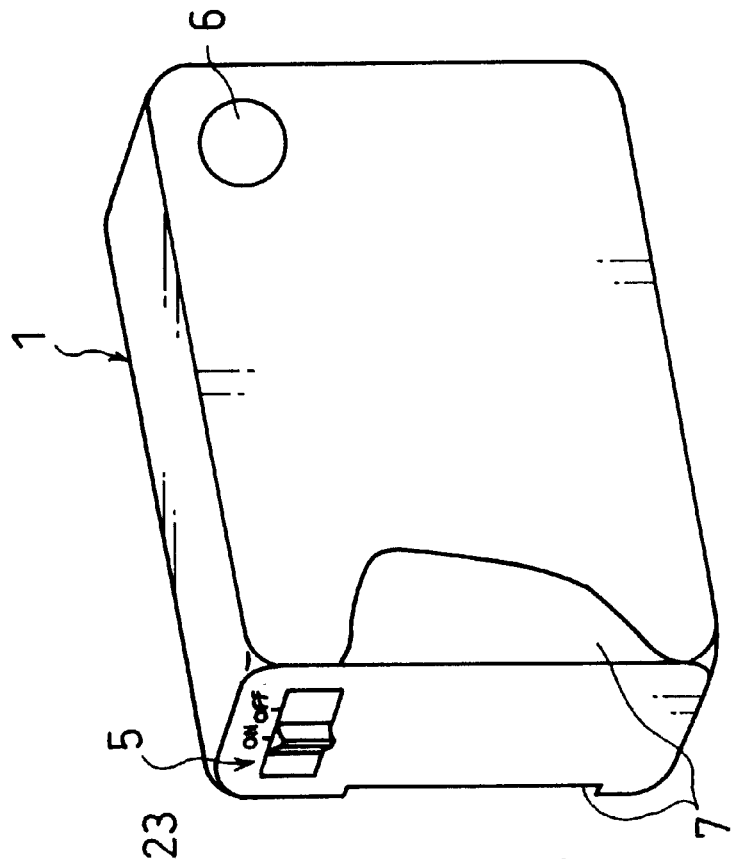

F I G. 1 2
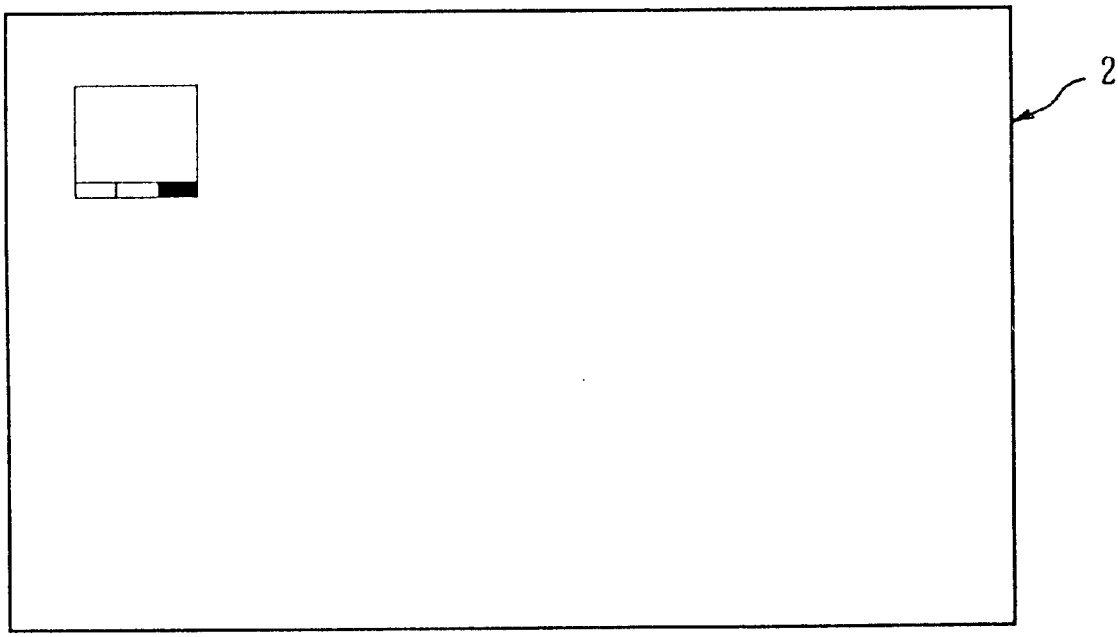

| | かな | 漢字 |
|---|---|---|
| | | |
| | | |
| | | |
| | | |
| | | |
| | | |

| | かな | 漢字 |
|---|---|---|
| | | |
| | | |
| | | |
| | | |
| | | |
| | | |

CHARACTER RECOGNITION DEVICE

FIELD OF THE INVENTION

The present invention relates to a character recognition device, such as an electrophotographic apparatus, for recognizing a character image that has been picked up.

BACKGROUND OF THE INVENTION

Conventionally, for example, Japanese Laid-Open Patent Publication No. 80791/1987 (Tokukaishou 62-80791) has disclosed a method for recognizing a character image that has been picked up, wherein: image information, such as a character image that has been inputted, is set as a reference pattern, the storage size of a dictionary pattern is set based on the size of the reference pattern, and the image information is recognized based on the dictionary pattern.

Moreover, Japanese Laid-Open Patent Publication No. 74729/1994 (Tokukaihei 6-74729) has disclosed a method wherein: the distance between a character to be recognized and a camera is calculated, a zooming operation of the camera is carried out based on the calculated distance so as to allow the character to be recognized to have a predetermined size so that the character image to be recognized is inputted.

However, the problem with the character recognition device using the conventional methods is that in the case when a character image, which has been temporarily stored, is recognized later, if the character image once stored can not be recognized, the image pick-up operation (reading operation) has to be repeatedly carried out until the character image has been recognized.

For this reason, for example, in the case when a character image, which has been picked up by using a portable-type electronic camera serving as a character recognition device and has been stored therein, is later subject to a character-image recognition at a site different from the site where it was picked up, if the stored character image can not be recognized, the user has to return to the site where it was picked up and re-pick up the same character image.

Furthermore, at the time when a character image is picked up, neither of the character recognition devices using the above-mentioned conventional methods makes a judgment as to whether or not the character image can be recognized. For this reason, even in the case when the character image that has been picked up is recognized at that site, if the character image that has been picked up includes any character that can not be recognized, the picking-up operation (the reading operation) of the character image has to be again carried out upon completion of the recognizing operation.

Another problem with the above-mentioned conventional techniques is that the enlarging operation is applied to even recognizable character images unnecessarily.

SUMMARY OF THE INVENTION

The first objective of the present invention is to provide a character recognition device which preliminarily allows confirmation as to whether or not characters in a character image that has been picked up are recognizable prior to a recognizing operation for the characters in the character image that has been picked up.

In order to achieve the first objective, the character recognition device, which is a character recognition device for recognizing characters in a character image that has been obtained by a CCD by using a recognizing section, is provided with: a character cut-out section for cutting out a character from the character image that has been obtained by the CCD; a character-size storing section for storing at least one character size among character sizes required for recognition each of which is set for each of character types that can be recognized by the recognizing section; a size-judging section for comparing the size of the character that has been cut out by the character cut-out section with at least one of character sizes that have been stored in the character-size storing section; and a display section for informing information corresponding to results obtained by comparing the size of the character that has been cut out by the character cutout section with at least one of character sizes that have been stored in the character-size storing section by using the size-judging section.

With the above-mentioned arrangement, the size of the cut-out character is compared with at least one of the character sizes required for recognition, and by informing the information corresponding to the results, it becomes possible to confirm whether or not the character that has been picked up and cut out is recognizable prior to the recognizing operation so as to provide a guidance for the recognition.

Moreover, the second objective of the present invention is to provide a character recognition device which, if the size of a character image is not recognizable, informs the user of the fact.

In order to achieve the second objective, the character recognition device of the present invention, which is a character recognition device having the above-mentioned arrangement, is designed so that the size-judging section makes a judgment as to whether or not the size of the cut-out character is a recognizable size based upon the results of comparison between the size of the character that has been cut out by the character cut-out section and at least one of character sizes that have been stored in the character-size storing section, and so that if the size-judging section makes a judgment that the size of the cut-out character is less than the recognizable size, the display section informs the user of the fact that it is not recognizable.

With the above-mentioned arrangement, if the cut-out character is judged as being unrecognizable based upon its size, the user is informed of the fact so that the user can easily confirm whether or not characters in the character image that has been read are recognizable.

The third objective of the present invention is to provide a character recognition device which informs the user of what type of character a character to be cut out should be so as to become recognizable.

In order to achieve the third objective, the character recognition device of the present invention, which is a character recognition device having the above-mentioned arrangement, is designed so that the size-judging section makes a judgment as to what type of character a character to be cut out should be so as to become recognizable based upon the results of comparison between the size of the character that has been cut out by the character cut-out section and a plurality of character sizes that have been stored in the character-size storing section, and so that the display section informs the user of the character type that has been judged by the size-judging section as being recognizable.

With the above-mentioned arrangement, since the user becomes aware of what type of character a character to be cut out should be so as to become recognizable, the user can easily confirm whether or not a character to be recognized is recognizable or not.

The fourth objective of the present invention is to provide a character recognition device which extracts a character having a recognizable size that is set depending on character types from a character image that has been picked up so as to inform this character.

In order to achieve the fourth objective, the character recognition device of the present invention, which is a character recognition device having the above-mentioned arrangement, is designed so that the size-judging section selects a character having a recognizable size that is set depending on character types based upon the results of comparison between the size of the character that has been cut out by the character cut-out section and at least one of character sizes that have been stored in the character-size storing section, and so that the display section informs the user of the character selected by the size-judging section, as well as information indicating the recognizable size.

With the above-mentioned arrangement, since the character that has been extracted by the size-judging section is informed together with the information indicating the recognizable size, the user can easily confirm whether or not a character to be selected has a recognizable size based upon the size of the extracted character. As a result, the user can easily confirm whether or not the character to be recognized is recognizable.

The fifth objective of the present invention is to provide a character recognition device which, if the size of a cut-out character is not a recognizable size, enlarges the character into the recognizable size.

In order to achieve the fifth objective, the character recognition device of the present invention, which is a character recognition device having the above-mentioned arrangement, is further provided with a zoom mechanism section for enlarging a character image that has been picked up, in which: the size-judging section makes a judgment as to whether or not the size of the cut-out character is a recognizable size based upon the results of comparison between the size of the character that has been cut out by the character cut-out section and at least one of character sizes that have been stored in the character-size storing section; if the size-judging section makes a judgment that the size of the cut-out character is less than the recognizable size, the zoom mechanism section enlarges the character to the recognizable size; and the display section informs the user of information indicating the character enlarged by the zoom mechanism section.

With the above-mentioned arrangement, even if the size of a cut-out character is not a recognizable size, the character image is enlarged to the recognizable size prior to a recognizing operation, the necessary character recognition can be carried out by performing a re-reading operation only once.

For a fuller understanding of the nature and advantages of the invention, reference should be made to the ensuing detailed description taken in conjunction with the accompanying drawings.

BRIEF DESCRIPTION OF THE DRAWINGS

FIG. 2(a) is a perspective view that shows the appearance of the character recognition device when seen from the photographer's side in accordance with one embodiment of the present invention.

FIG. 2(b) is a perspective view that shows the appearance of the character recognition device shown in FIG. 2(a) when seen in the direction opposite to the photographer.

FIGS. 5 through 13 are explanatory drawings that show examples of display screens that display the results of judgment on character sizes carried out in a character recognition device in accordance with another embodiment of the present invention.

FIG. 15 is an explanatory drawing that shows an example of a display screen that displays the results of judgment on character sizes carried out in a character recognition device in accordance with still another embodiment of the present invention.

FIGS. 17(a) and 17(b) are explanatory drawings that show examples of display screens in a character recognition device in accordance with still another embodiment of the present invention.

DESCRIPTION OF THE EMBODIMENTS

EMBODIMENT 1

Referring to FIGS. 1 through 4 the following description will discuss one embodiment of the present invention.

FIG. 2(a) is a perspective view that shows the appearance of the character recognition device when seen from the photographer's side in accordance with one embodiment of the present invention, and FIG. 2(b) is a perspective view that shows the appearance of the character recognition device shown in FIG. 2(a) when seen in the direction opposite to the photographer.

As illustrated in FIGS. 2(a) and 2(b), the character recognition device is constituted by a main-body cabinet section 1 on which a display section 2, a CCD camera section 6, a switching section 23, etc. are installed.

Figure 1:
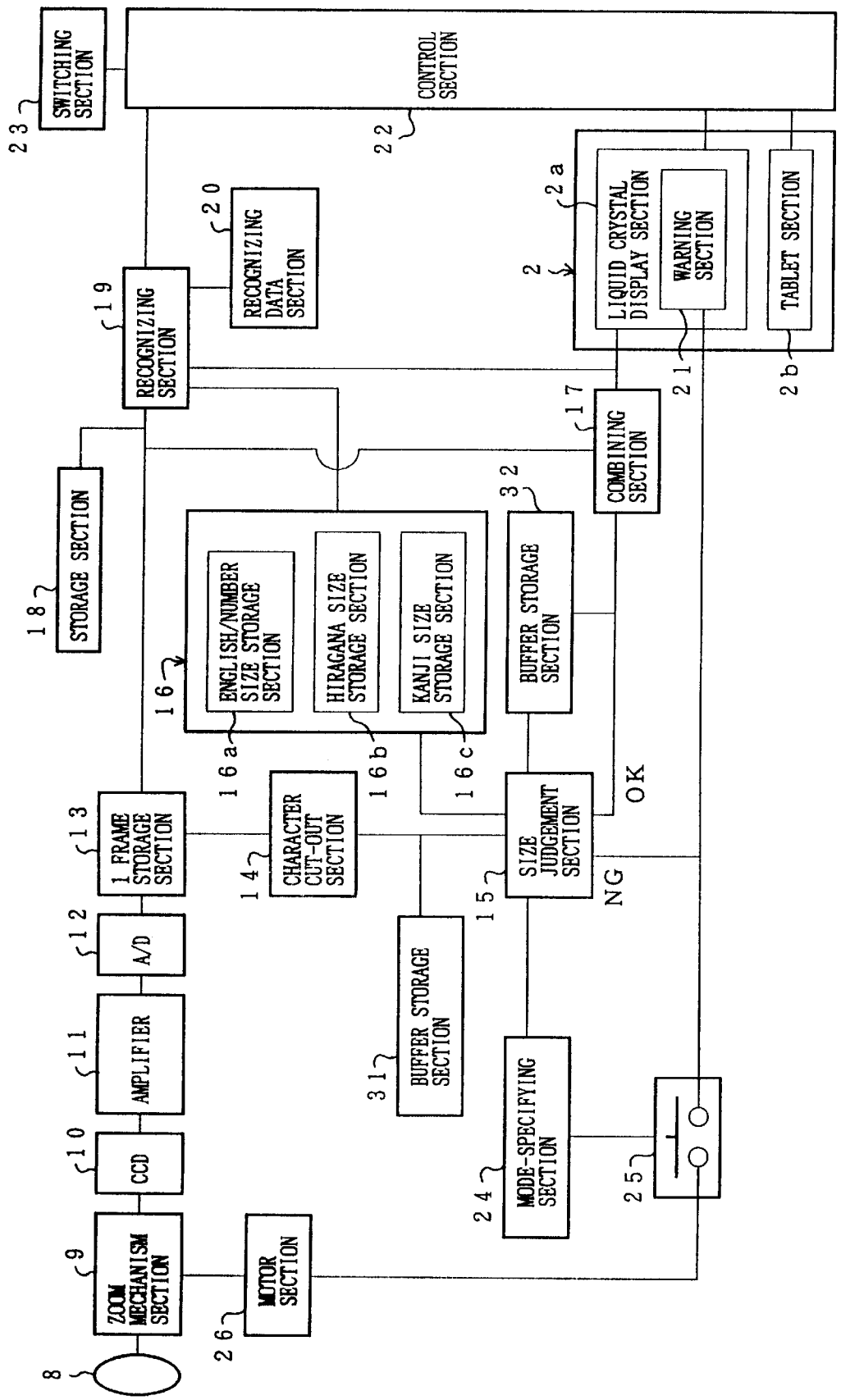
FIG. 1 is a block diagram showing a character recognition device in accordance with one embodiment of the present invention.

As illustrated in FIG. 1, the CCD camera section 6 (image pick-up means) is constituted by a CCD 10 serving as a pick-up element for reading a character image by picking it up, a lens section 8 for converging light onto the CCD 10, and a zoom mechanism section 9 for enlarging the character image (a subject image) that has been converged by the lens section 8 in a desired manner so as to project it onto the image pick-up surface of the CCD 10, etc.

The display section 2, which displays the character image that has been picked up by the CCD camera section 6, has a construction in which a thin-type liquid crystal display section 2a, which uses the matrix system capable of displaying character images, and a tablet section 2b having a size large enough to cover the liquid crystal display section 2a are integrated into one unit.

The tablet section 2b is provided with, for example, a pair of transparent sheets that are aligned face to face with each other. Further, transparent electrodes are respectively installed on the inside surfaces (on the opposing faces) of the pair of the sheets, and spacers having a small protruding shape are regularly printed thereon so as not to allow the electrodes to contact each other until the tablet section 26 is depressed. Thus, the transparent electrodes attached to the respective sheets normally do not contact each other; however, when the tablet section 2b, connected to these transparent electrodes, is pointed (pressed) by a finger or a pen, the electrodes are allowed to contact each other at the pointed place. Consequently, the coordinate position selected and pointed can be detected by using the tablet section 2b.

As illustrated in FIGS. 2(a) and 2(b), the switching section 23 is provided with an image-taking key 3, a storage-specifying key 4, and a power switch 5. The image-taking key 3 is a key used to start an image pick-up operation, the storage-specifying key 4 is used to specify the storage of the image that has been read, and the power switch 5 turns on and off the power of the apparatus. As illustrated in FIG. 1, the display section 2, the CCD camera section 6, the switching section 23, etc. are respectively connected to a control section 22 installed inside the main-body cabinet section 1. Thus, the control section 22 controls input information and output information by using various commands.

Moreover, as illustrated in FIGS. 2(a) and 2(b), the main-body cabinet section 1, which forms a housing of the character recognition device of the present embodiment, is provided with a holding portion 7 in the side face of the main-body cabinet section 1, which is shaped into a recess so as to allow ease of handing of the character recognition device. Furthermore, although not shown in the perspective views showing the appearance thereof in FIGS. 2(a) and 2(b), the main-body cabinet section 1 is also provided with an interface section for exchanging date to and from external apparatuses, a microphone, a speaker, etc., and has a modem, etc. for communicating with external apparatuses as built-in components.

Referring to FIGS. 1 through 4, an explanation will be given of preliminary processes before character recognition is carried out by using the character recognition device.

Upon carrying out character recognition by using the character recognition device, first the user turns power on using the power switch 5, directs the CCD camera section 6 toward a subject whose image is to be picked up, and pushes the image-taking key 3 once. Then, a character image including characters is picked up (photographed) by the CCD camera section 6. First, light, which has been converged by the lens section 8, is desirably enlarged by the zoom mechanism section 9, and projected onto the image pick-up surface section of the CCD 10. Next, the CCD 10 photoelectrically transfers the light projected by the lens section 8 through the zoom mechanism section 9 so that it is transferred to an analog signal (image signal) as an electric signal. The analog signal is amplified by an amplifier 11, and outputted to an A/D (Analog-to-Digital) converter 12. The image signal, which has been converted into a digital signal by the A/D converter 12, is temporarily stored in a one-frame storage section 13, and outputted to a character cut-out section 14 (character cut-out means), and also displayed on the display section 2 as an image through a combining section 17.

In the character cut-out section 14, character display areas, located within the character image displayed on the display section 2, are cut out as character information.

This cut-out process of the character image is carried out by methods that have been conventionally used. For example, the following method is listed as the cut-out process of the character image. First, pixels having the same color are picked up from one lateral row, and the total number is found. Next, with respect to each portion at which the total number is great, pixels in a longitudinal column are totaled. Then, each of the longitudinal columns at which the total number is great is regarded as an area (a character display area) including characters.

Then, the information of the characters that have been cut out by the character cut-out section 14 is outputted to a size judgment section 15 (character-size comparison/judgment means). In the size judgment section 15, the size of the characters cut out by the character cut-out section 14 is compared with a reference character size that has been preliminarily stored in a size storage section 16 (character-size storage means), and a judgment is made as to whether or not the size of the characters cut out by the character cut-out section 14 is recognizable. In other words, the size judgment section 15 serves both as a character-size comparison means for comparing the size of the cut-out character and the sizes of character stored in the character-size storage means and as a character-size judgment means for judging whether or not the size of the cut-out characters is a recognizable size.

At this time, with respect to the information of the characters cut out by the character cut-out section 14, it may be outputted to the size judgment section 15 each time a character is cut out by the character cut-out section 14, and the size of the cut-out character may be successively compared with the reference character size in the size judgment section 15 one character by one character. Alternatively, characters within a specified area may be cut out in succession so that all information of the cut-out characters is temporarily stored in, for example, a buffer storage section 31, and the character size is picked up one character by one character from the storage, and the picked-up character size may be compared with the reference character size.

The size storage section 16 includes English/number size storage section 16a, Hiragana size storage section 16b and Kanji size storage section 16c so that recognizable character sizes are stored for the respective types of characters.

In the English/number storage section 16a, a character size (hereinafter, referred to as English/number size: for example, 8×8 dots) required for recognition of English/number characters is stored. Here, English/number characters can be recognized most easily, and the character size required for recognition increases in the ascending order of: English/number characters, Hiragana (Katakana) characters and Kanji characters. In other words, the English/number size refers to a size by which only English/number characters become recognizable.

Moreover, in the Hiragana size storage section 16b, a size (hereinafter, referred to as Hiragana size: for example, 16×16 dots) required for recognition of Hiragana and Katakana characters is stored. That is, the character size by which English/number characters or Hiragana or Katakana characters become recognizable is stored. Additionally, in the following explanation, it is supposed that Katakana characters are included in Hiragana characters.

Furthermore, in the Kanji size storage section 16c, a size (hereinafter, referred to as Kanji size: for example, 64×64 dots) required for recognition of Kanji characters is stored. That is, the character size by which any of the English/number characters, Hiragana or Katakana characters and Kanji characters become recognizable.

In the present embodiment, it is supposed that the character size, stored in the Kanji size storage section 16c, is set as a reference size; however, the reference character size is not limited to the Kanji size, and any of three types of English/number size, Hiragana size and Kanji size may be preliminarily selected by the user as the reference character size. In other words, for example, if characters to be recognized are only English/number characters, the reference character size may be set as the English/number size. Thus, a recognizable size may be determined as the reference size depending on the types of characters to be recognized so that a process suitable for the character size to be recognized can be carried out.

Next, in the size judgment section 15, as a result of comparison between the reference size and the size of a character cut out by the character cut-out section 14, if the size of the cut-out character is larger than or the same as the reference character size, information of the character cut out by the character cut-out section 14 is outputted to the display section 2 through the combining section 17 by using a control line on the OK side.

In this case, if the user presses the storage-specifying key 4 included in the switching section 23, a signal is outputted from the switching section 23 to the control section 22 so that the character image of one-frame storage section 13, which is displayed on the display section 2, is stored in the storage section 18.

Figure 3:
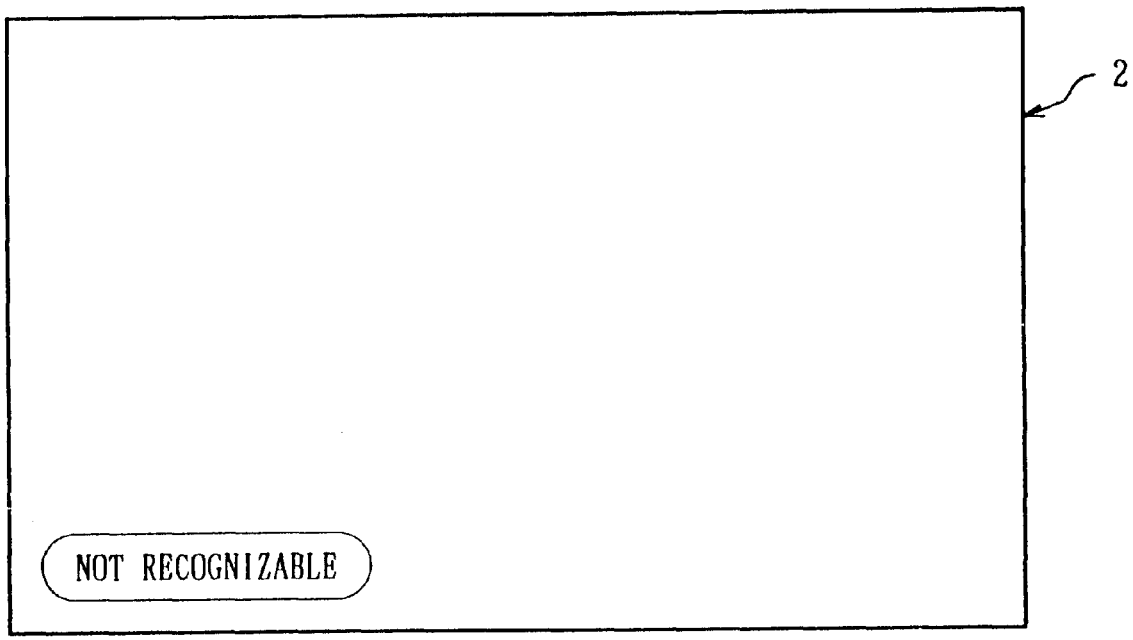
FIG. 3 is an explanatory view that shows one example of a display screen which displays the results of judgment on character sizes carried out in the character recognition device.

In the size judgment section 15, as a result of comparison between the reference character size and the size of a character cut out by the character cut-out section 14, if the size of the cut-out character is smaller than the reference character size, the cut-out character image is judged as being too small to be recognized, and the result of the judgment is outputted to the warning section 21 installed on the liquid crystal display section 2a by using a control line on the NG side. In the warning section 21, a character pattern, for example, "Not recognizable" is provided separately from the display area for the image that has been picked up, and based upon the signal outputted from the size judgment section 15, the character pattern is lighted on, as illustrated in FIG. 3, so that the warning display is provided as a predetermined position (for example, at the down left corner of the display section 2) of the display section.

The result of a judgment in the size judgment section 15 may be outputted to the combining section 17 or the warning section 21 and informed each time a judgment is made, or it may be temporarily stored in, for example, the buffer storage section 32 as information (data), and then outputted as one lot.

Moreover, in the case when the result of a judgment is outputted for each character (that is, each time a judgment is made), a display indicating whether or not the character can be recognized may be provided around the character that has been subjected to the judgment.

The judgment as to whether or not the character is recognizable may be informed by the presence or absence of the warning display indicating that it is unrecognizable, without giving a specific display indicating that it is recognizable even when the cut-out character is judged as being recognizable. Alternatively, as will be described in embodiments later, the judgment may be informed by adding (placing) a character or a symbol indicating that it is recognizable to the vicinity of the character that has been judged as being recognizable or adding a color, etc. thereto.

Figure 4:
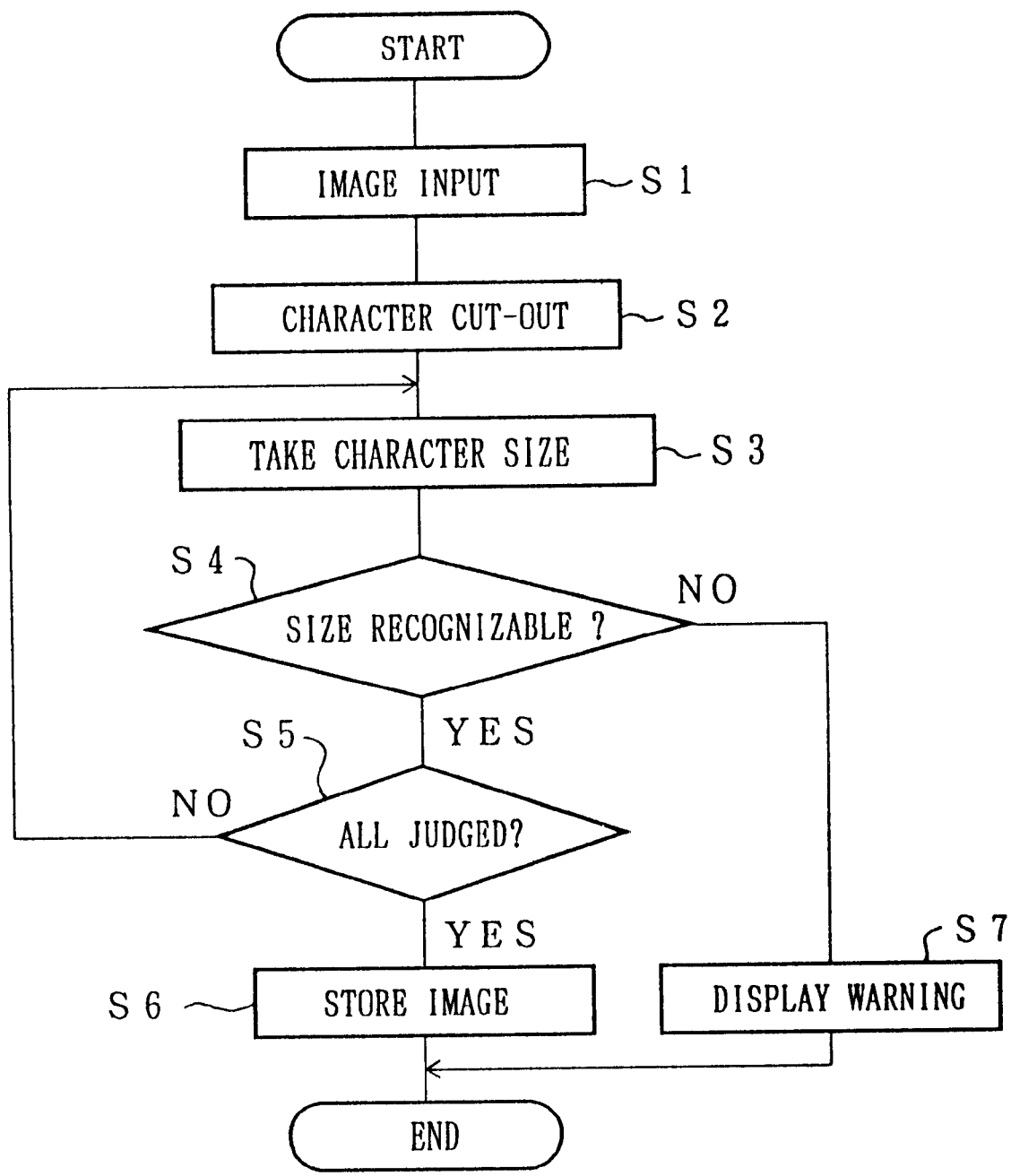
FIG. 4 is a flowchart that shows the sequence of processes prior to character recognition in the character recognition device.

Referring to a flow chart shown in FIG. 4, the following description will discuss one example of these processes.

First, when the user presses the image-taking key 3, the control section 22 reads a character image related to the pressing of the image-taking key 3 by the user by using the CCD camera section 6 (an image input)(STEP 1: hereinafter, Step is referred to simply as S), and the character cut-out section 14 successively cuts out characters (character display areas) from the character image that has been read (S2)

Next, the control section 22 picks up the size of one of the characters that have been cut out (S3), and the size judgment section 15 compares the size of the character thus picked up with the reference character size preliminarily stored in the size storage section 16. Then, a judgment is made as to whether or not the character is recognizable by judging whether or not the size of the character picked up is larger than or the same as the reference character size (S4).

In this case, when the size of the character picked up is larger than or the same as the reference character size, the control section 22 allows the size judgment section 15 to make a judgment that the character that has been picked up is recognizable, and successively, checks out whether or not judgments as to recognition have been carried out on all the characters that have been read (cut out) (S5).

When all the characters that were read (cut out) have been judged as being recognizable at S5, the character image that was read is stored in the storage section 18 in accordance with a signal from the storage-specifying key 4 (S6).

On the other hand, if judgments as to recognition have not been made on all the characters that were read (cut out) at S5, the sequence returns to S3, and the processes S3 through S5 are repeated until judgments as to recognition have been finished on all the characters that were read (cut out).

Then, at S4, if the size of the character picked up is judged as being smaller than the reference character size, the warning section 21 gives the warning display "Not recognizable" in accordance with the signal from the size judgment section 15 (S7).

The character image, which has been stored in the storage section 18 in the above-mentioned explanation, is later compared in a recognizing section 19 by the control section 22 with data stored in a recognizing data section 20 for storing character patterns for recognizing the contents of the storage section 18 that was stored before, thereby carrying out a character recognition. The result of the recognition is replaced by the character image, and displayed on the display section 2.

Additionally, in the above-mentioned explanation, in the case when each time a character is cut out, a judgment as to recognition is carried out on the character, if, at S5, judgments as to recognition have not been made on all the characters that were read (cut out), the sequence returns to S2, and by cutting out the next character to the one that has been subjected to a judgment, a judgment can be made as to whether or not the cut-out character is recognizable each time one character is cut out.

Further, in the present embodiment, if, in the size judgment section 15, the size of a character that has been cut out by the character cut-out section 14 is judged as being less than the recognizable size, the display section 2 is used as an informing means for informing the result of the judgment; however, the method for informing the incapability of recognition as a result of a judgment in the size judgment section 15 is not limited to this method, and for example, the warning may be given by using a speaker, etc.

As described above, with the above-mentioned processes in the present embodiment, if a character image that has been read is not recognizable, the user is informed of the fact prior to a recognizing operation, for example, by giving a warning display on the display section 2.

Therefore, the present embodiment makes it possible to provide a character recognition device by which the user can confirm whether or not characters in a character image that has been picked up are recognizable, prior to carrying out a recognizing operation on the characters in the character image that has been picked up.

EMBODIMENT 2

Referring to FIGS. 1, 2(a), 2(b) and 5 through 14, the following description will discuss another embodiment of the present invention. Here, for convenience of explanation, those of the members described in Embodiment 1 are indicated by the same reference numerals and the description thereof is omitted. In this embodiment, an explanation will be mainly given of distinctions over Embodiment 1.

In the character recognition device of the present embodiment, the size judgment means 15 (character-size comparison/judgment means) makes a judgment as to which type of characters among English/number, Hiragana, Katakana and Kanji characters should be selected so as to recognize characters that have been cut out by the character cut-out section 14 (character cut-out means), based upon the character sizes stored in the size storage section 16 (character-size storage means), and the result of the judgment is informed.

Referring to FIGS. 1, 2(a), 2(b) and 5 through 13, an explanation will be given of preliminary processes before character recognition is carried out by using the character recognition device.

Upon carrying out character recognition by using the character recognition device, first the user turns power on using the power switch 5, directs the CCD camera section 6 toward a subject whose image is to be picked up, and pushes the image-taking key 3 once. Then, a character image including characters is picked up (photographed) by the CCD camera section 6. First, light, which has been converged by the lens section 8, is desirably enlarged by the zoom mechanism section 9, and projected onto the image pick-up surface section of the CCD 10. Next, the CCD 10 photoelectrically transfers the light projected by the lens section 8 through the zoom mechanism section 9 so that it is transferred to an analog signal (image signal) as an electric signal. The analog signal is amplified by an amplifier 11, and outputted to an A/D converter 12. The image signal, which has been converted into a digital signal by the A/D converter 12, is temporarily stored in a one-frame storage section 13, and outputted to a character cut-out section 14, and also displayed on the display section 2 as an image through a combining section 17.

In the character cut-out section 14, character display areas among the character image displayed on the display section 2 are successively cut out as character information, and this is outputted to the size judgment section 15.

In the present embodiment, the size judgment section 15 compares the size of a character that has been cut out by the character cut-out section 14 with the Kanji size, Hiragana size and English/number size that have been preliminarily stored in the size storage section 16. Then, it checks out which character size the size of the character cut out by the character cut-out section 14 corresponds to, and makes a judgment as to which type of the characters among the English/number, Hiragana and Kanji characters should be selected so as to recognize the character. In other words, in the present embodiment, the size judgment section 15 also functions as a judgment means for making a judgment as to which type of the characters should be selected so as to recognize the character that has been cut out.

More specifically, in the aforementioned Embodiment 1, the size of a character that has been cut out is compared with one type of character size (a reference character size), and a judgment as to recognition is made based upon the result of the comparison. In the present embodiment, the size of a character that has been cut out is compared with a plurality of character sizes that correspond to the types of characters, and a judgment as to recognition is made based upon the results of these comparisons.

For example, supposing that the size of a character that has been cut out is 9×9 dots, the English/number size stored in the size storage section 16 is 8×8 dots, the Hiragana size is 16×16 dots, and the Kanji size is 64×64 dots, the size judgment section 15 first compares the size of the character that has been cut out with the Kanji size. In this case, since the size of the character that has been cut out is smaller than the Kanji size, the size of the character that has been cut out is next compared with the Hiragana size. However, since the size of the character that has been cut out is smaller than the Hiragana size, the size of the character that has been cut out is further compared with the English/number size.

In this case, since the size of the character that has been cut out is larger than the English/number size, the size judgment section 15 makes a judgment that if the English/number size is selected, the character that has been cut out becomes recognizable. Then, information indicating that the character that has been cut out by the character cut-out section 14 corresponds to the English/number size is outputted to the combining section 17 (character-modification means) through a control line on the OK side.

Figure 5:
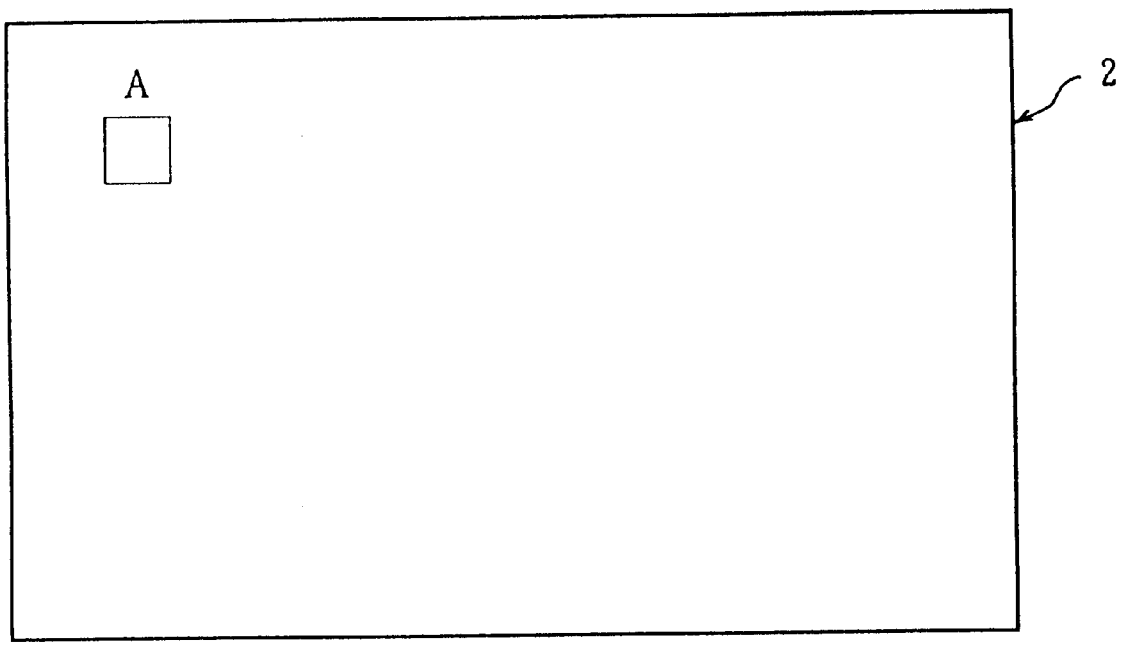

In the combining section 17, a character frame as shown in FIG. 5 is placed around the character that has been cut out in a manner so as to surround the character that has been cut out, and at a predetermined position on the character frame (for example, an upper portion on the character frame), a character (a character or a symbol indicating the recognizable size for the character that has been cut out) indicating what type of the characters the character that has been cut out should be so as to become recognizable, and this character is combined with the character that has been cut out, and displayed on the display section 2.

In this case, if the user confirms that the character that has been cut out is recognizable by the contents of display on the display section 2, and presses the storage-specifying key 4 included in the switching section 23, a signal is outputted from the switching section 23 to the control section 22 so that the character image of the one-frame storage section 13, displayed on the display section, is stored in the storage section 18.

In the above-mentioned example, the size of the character that has been cut out is so small that it only becomes recognizable when it is an English or a number character; therefore, as illustrated in FIG. 5, only "A" that indicates that recognition is available on the English/number basis is displayed on the upper portion of the character frame.

Figure 6:
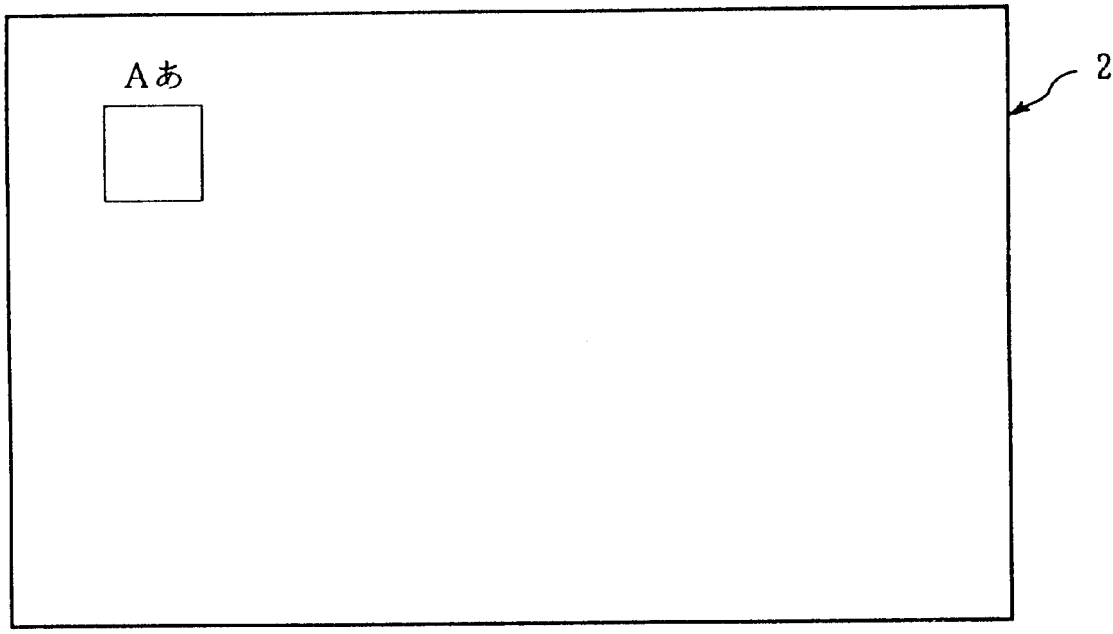

However, if the character that has been cut out is a character of the Hiragana size that is larger than the size in which only English/number characters can be recognized, then a character "Aあ" is displayed on the upper portion of the character frame so as to inform the user that recognition is available not only on the English/number basis but also on the Hiragana basis, as illustrated in FIG. 6.

Figure 7:
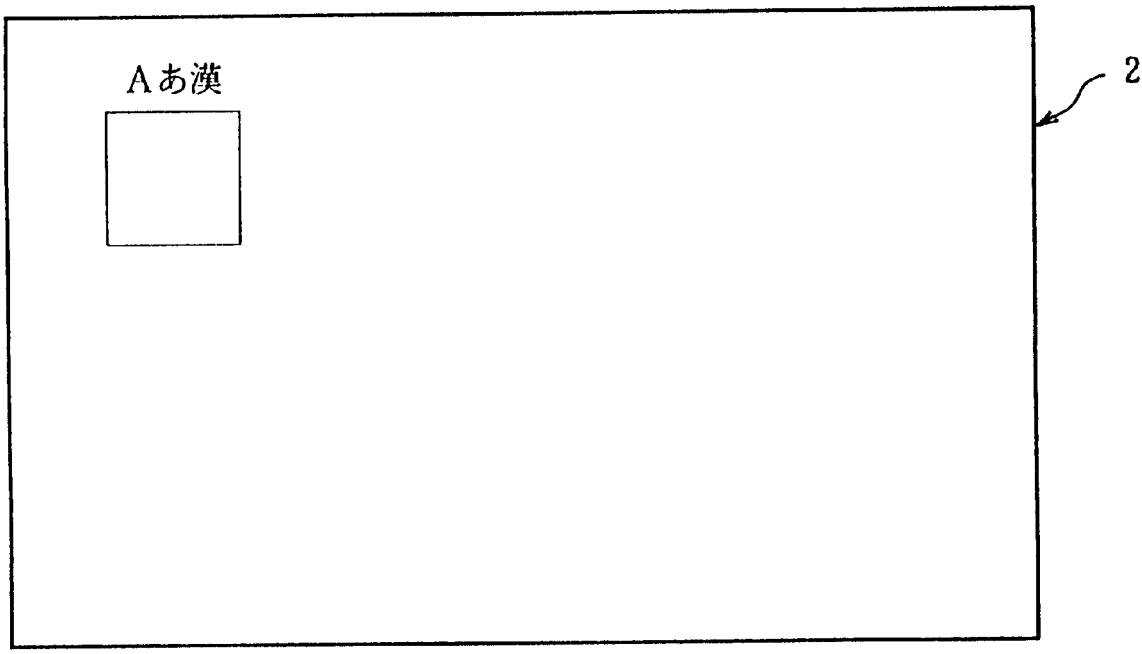

Moreover, if the character that has been cut out has a size in which even a complex character having a lot of strokes, like a Kanji, can be recognized, then a character "Aあ溪" is displayed on the upper portion of the character frame as illustrated in FIG. 7 so as to inform the user that any of the English/number, Hiragana, and Kanji characters can be recognized.

Figure 8:
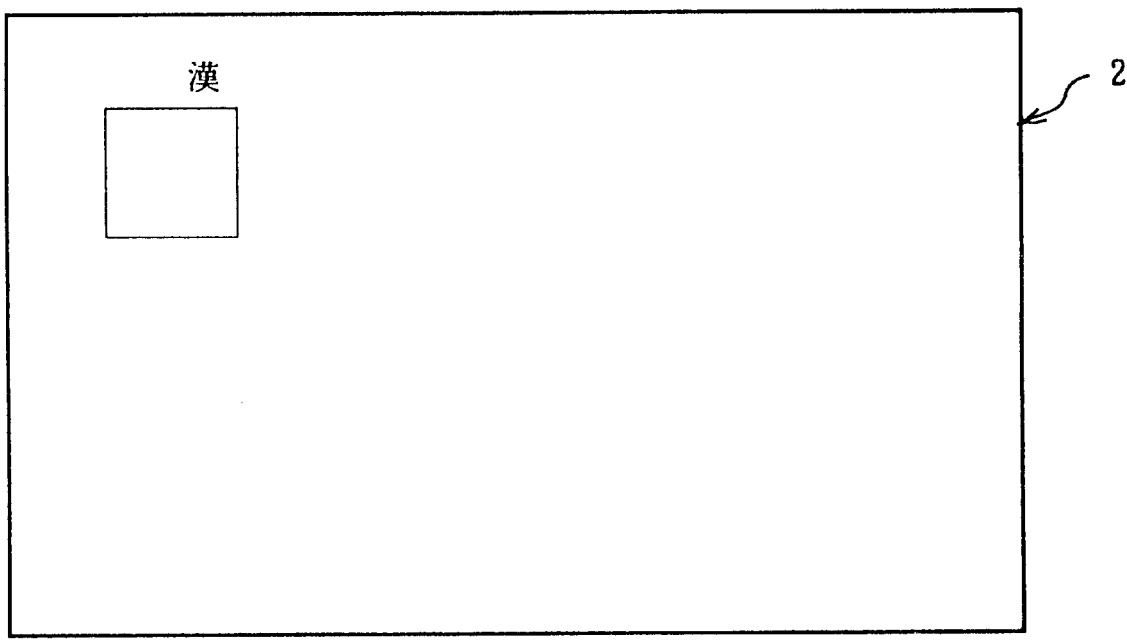
Figure 9:
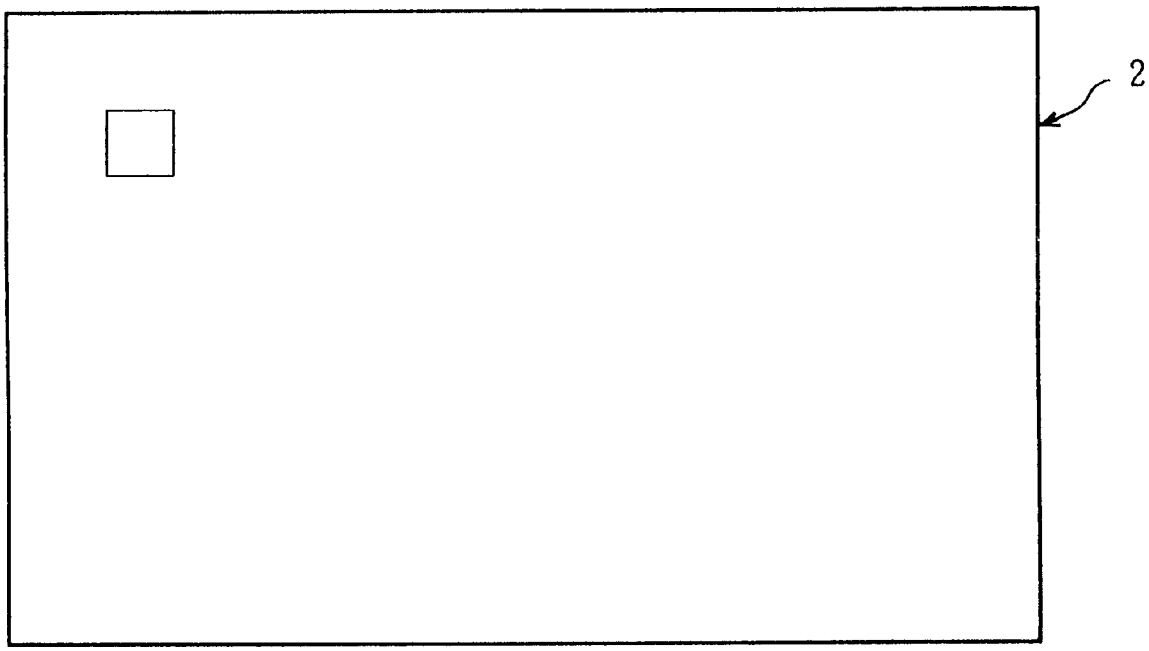

Furthermore, if the character that has been cut out is a character having a size in which even Kanji characters can be recognized, only a character "溪" may be displayed on the upper portion of the character frame as illustrated in FIG. 8 since it is clear that English and number characters and Hiragana characters can be recognized. In other words, among the types of characters (hereinafter, referred to as the recognizable character type) that are identified as being recognizable based upon the character that has been cut out, only the character type (hereinafter, referred to as the largest recognizable character type) having the largest size required for recognition may be displayed.

Figure 10:
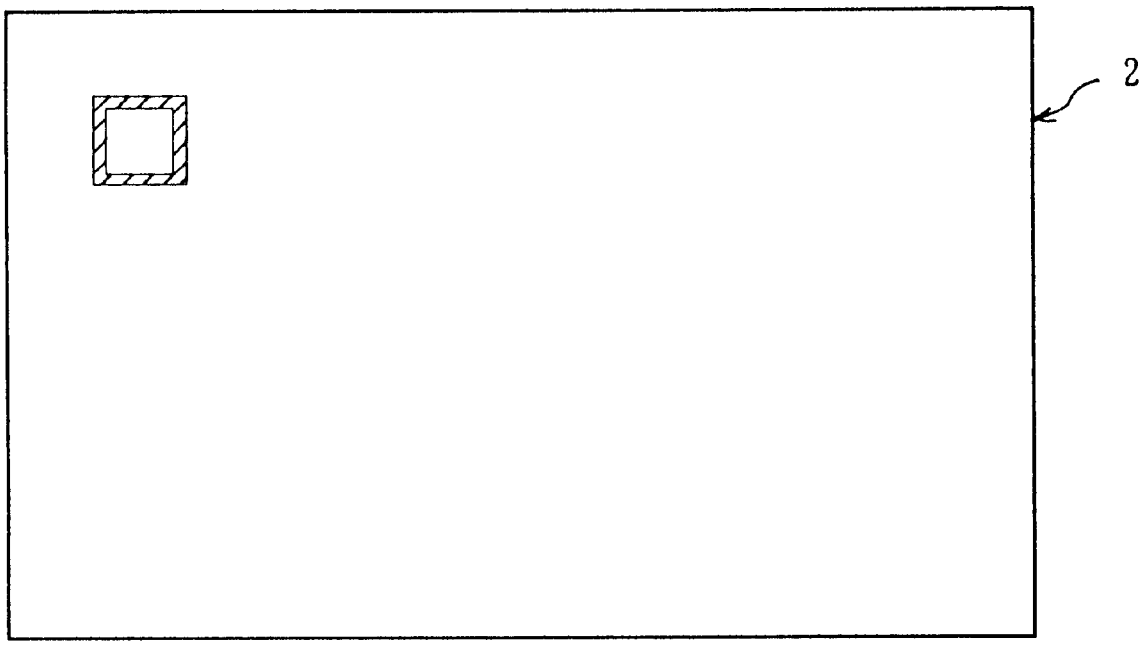
Figure 11:
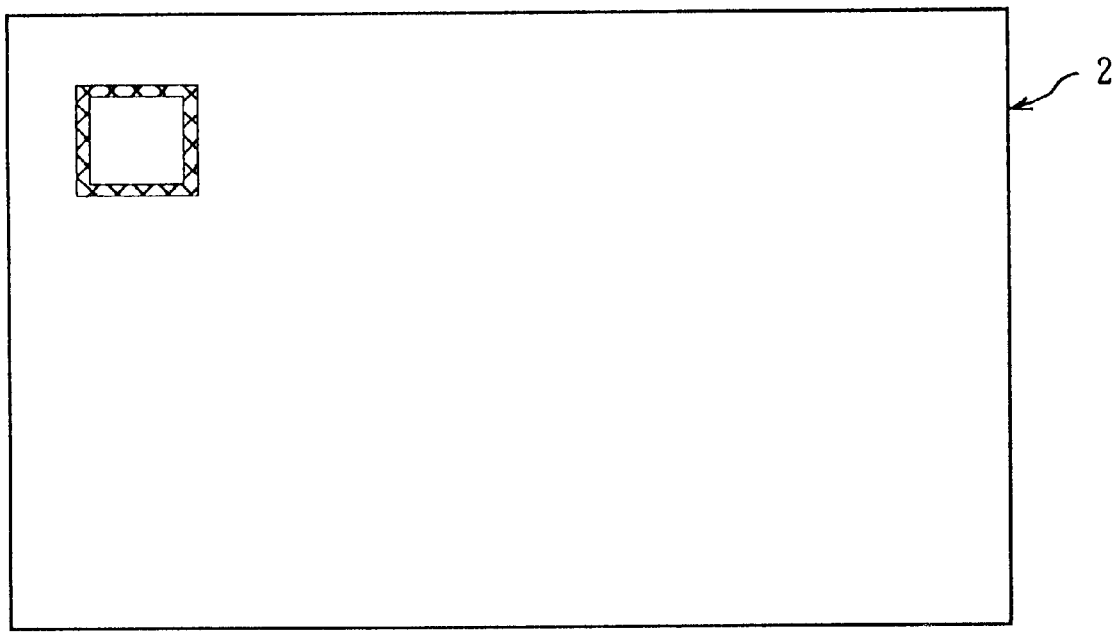

In this case, as illustrated in FIGS. 10 and 11, instead of displaying the recognizable character type on the upper portion of the frame of the character that has been cut out, the pattern of the character frame may be changed into a net pattern or a slanting-line pattern that corresponds to the recognizable character types or the largest recognizable character type.

Further, as illustrated in FIG. 12, areas may be provided at a lower part of the character frame so that the recognizable character types are indicated by marking the area that corresponds to the recognizable character type or the largest recognizable character type.

Figure 13:
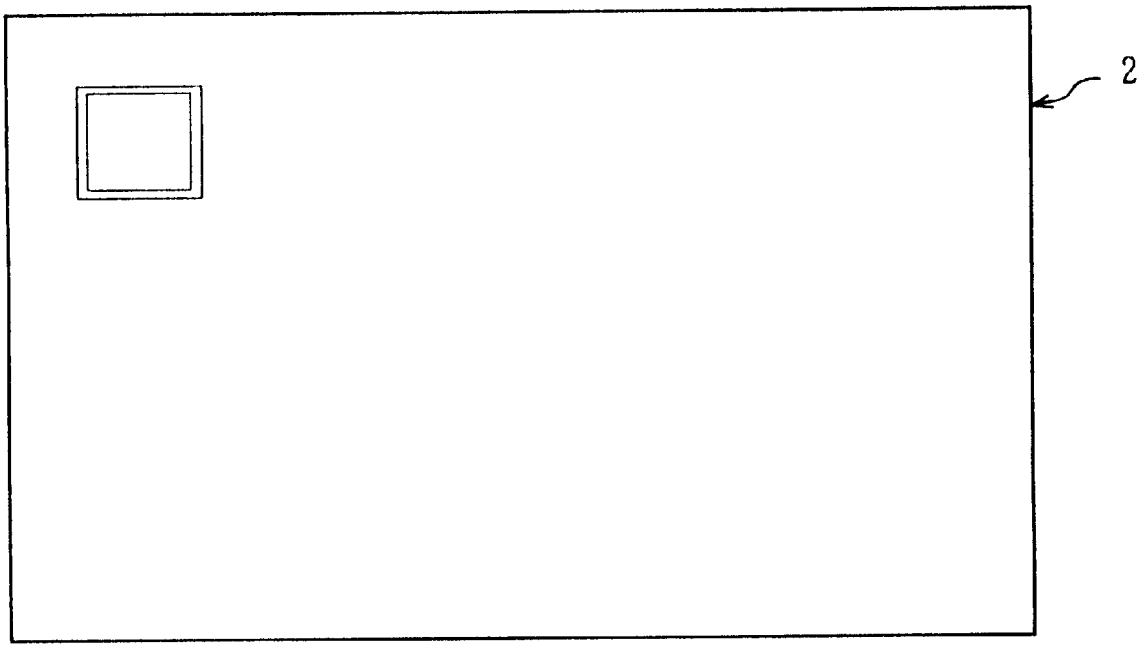

Moreover, as illustrated in FIG. 13, the recognizable character types may be indicated by doubling (or tripling) the character frame.

Furthermore, in order to distinguish recognizable character types, the character frame may be colored and displayed in a manner so as to correspond to the recognizable character types or the largest recognizable character type.

Figure 14:
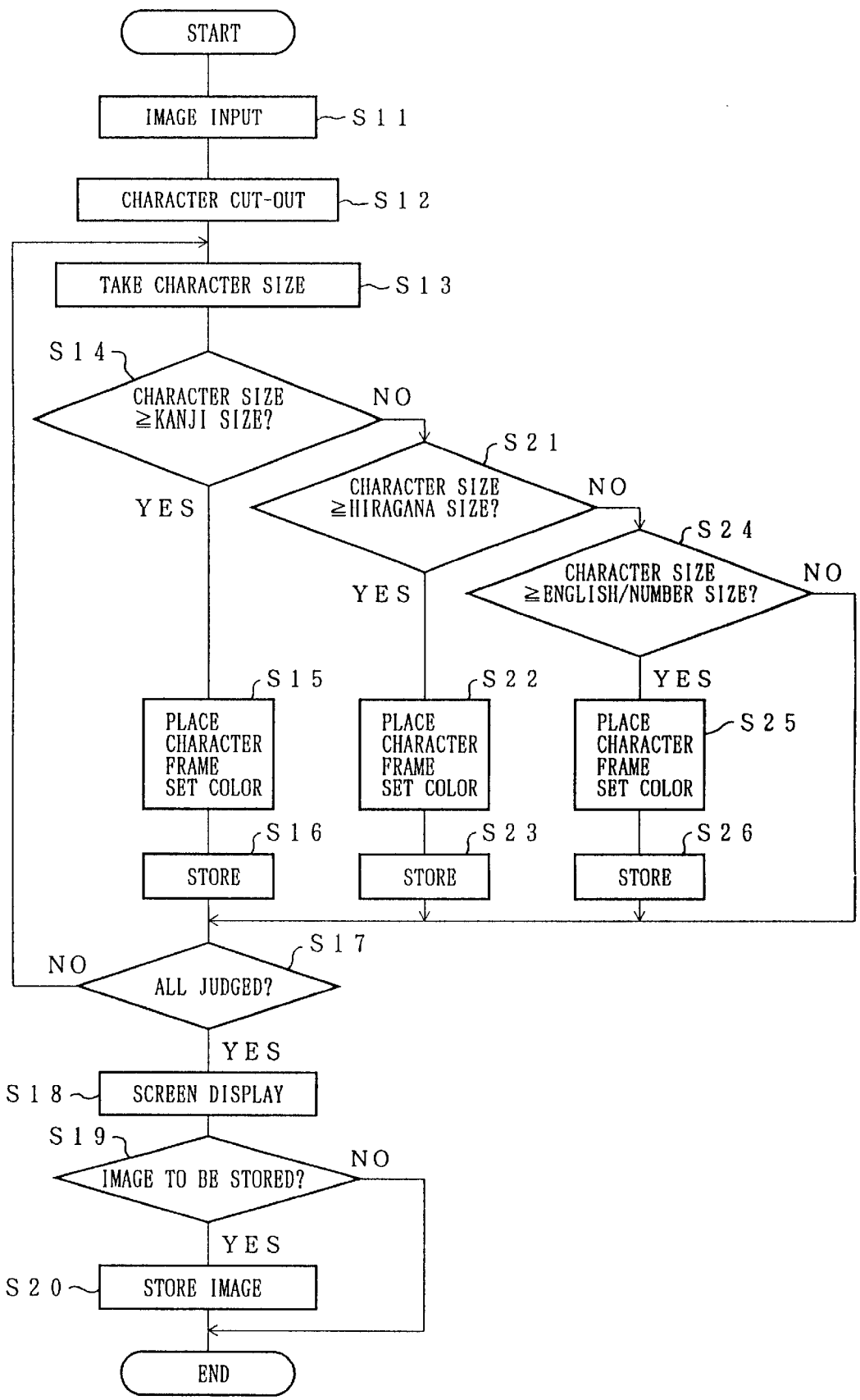
FIG. 14 is a flow chart that shows the sequence of processes prior to character recognition in the character recognition device in accordance with another embodiment of the present invention.

Referring to a flow chart in FIG. 14, an explanation will be given of the sequence of preliminary processes in the case when the recognizable character type(s) is distinguished by coloring and displaying the character frame.

First, when the user presses the image-taking key 3, the control section 22 reads a character image related to the pressing of the image-taking key 3 by the user by using the CCD camera section 6 (an image input) (S11), and the character cut-out section 14 successively cuts out characters (character display areas) from the character image that has been read (S12).

Next, the control section 22 picks up the size of one of the characters that have been cut out (S13), and the size judgment section 15 compares the size of the character thus picked up with the Kanji size preliminarily stored in the Kanji-size storage section 16a of the size storage section 16. Then, a judgment is made as to whether or not the size of the character that has been picked up is recognizable on the Kanji character basis by judging whether or not the size of the character picked up is not less than the Kanji size (S14).

In this case, if the size of the character that has been picked up is the same as or larger than the Kanji size, the control section 22 makes a judgment that the size of the character that has been picked up into the size recognition section 15 is recognizable on the Kanji character basis, and places a character frame around the character that has been picked up, as well as setting the color of the character frame in black (S15); thus, the control section 22 stores the fact that the size of the character that has been picked up is recognizable on the Kanji character basis as recognizable-size information in the buffer storage section 32 (S16).

Next, the control section 22 checks out whether or not judgments as to recognition (as to what character type (s) is recognizable, if recognizable) have been made by the size judgment section 15 on all the characters in the character image that has been read (cut out) (S17).

At Step 17, if the above-mentioned judgments have been made on all the characters that have been read (cut out), the image that has been read (that is, the image stored in one-frame storage section 13) is displayed on the display section 2 together with the recognizable-size information (that is, the colored character frame) stored in the size recognition section 16 (S18).

Thus, the user is allowed to make a judgment as to whether or not the character image that has been read is stored (S19), and if the user determines that the character image be stored, the character image that has been read is stored in the storage section 18 in accordance with the signal inputted by the storage-specifying key 4 (S20).

On the other hand, at S17, if the judgments have not been made on all the characters that have been read (cut out), the sequence returns to S13.

Further, at S14, if the size of the character that has been picked up is smaller than the Kanji size, the size of the character that has been picked up is further compared with the Hiragana size preliminarily stored in the Hiragana-size storage section 16b of the size storage section 16. Then, a judgment is made as to whether or not the size of the character that has been picked up is recognizable on the Hiragana basis by judging whether or not the size of the character that has been picked up is not less than the Hiragana size (S21).

In this case, if the size of the character that has been picked up is the same as or larger than the Hiragana size, the control section 22 makes a judgment that the size of the character that has been picked up is recognizable on the Hiragana character basis, and places a character frame around the character that has been picked up, as well as setting the color of the character frame in blue (S22). Thus, the control section 22 stores the fact that the size of the character that has been picked up is recognizable (that is, the largest recognizable character type is Hiragana) (S23) in the buffer storage section 32, and the sequence proceeds to S17.

Further, at S21, if the size of the character that has been picked up is smaller than the Hiragana size, the size of the character that has been picked up is further compared with the English/number size preliminarily stored in the English/number-size storage section 16c of the size storage section 16. Then, a judgment is made as to whether or not the character that has been picked up is recognizable on the English/number character basis by judging whether or not the size of the character that has been picked up is not less than the English/number size (S24).

In this case, if the size of the character that has been picked up is the same as or larger than the English/number size, the control section 22 makes a judgment that the size of the character that has been picked up is recognizable on the English/number basis, and places a character frame around the character that has been picked up, as well as setting the color of the character frame in red (S25). Thus, the control section 22 stores the fact that the size of the character that has been picked up is recognizable (that is, the largest recognizable character type is English/number) (S26) in the buffer storage section 32, and the sequence proceeds to S17.

The character image, stored in the storage section 18 in the above-mentioned explanation, is later subjected to a character recognition by being compared with data stored in the recognizing data section 20 in the recognition section 19, which is controlled by the control section 22. The result of the recognition is replaced by the character image, and displayed on the display section 2.

Additionally, in the above-mentioned explanation, in the case when each time a character is cut out, a judgment as to recognizable-character type is carried out on the character, if, at S17, the above-mentioned judgments have not been made on all the characters that were read (cut out), the sequence returns to S12, and by cutting out the next character to the one that has been subjected to the judgment, a judgment as to recognizable-character type is carried out on the character each time one character is cut out.

Further, in the above-mentioned processes, if, in the size judgment section 15, the size of a character that has been cut out by the character cut-out section 14 is judged as being less than the recognizable size, the size is not stored, and when the character is displayed on the display section 2, the character frame is not placed around it; however, the present invention is not intended to be limited to this arrangement, and for example, as shown in the aforementioned Embodiment 1, if the size of a character that has been cut out is judged as being less than the recognizable size, a warning display may be provided.

However, as indicated in the present embodiment, if the size of a character that has been cut out is judged as being less than the recognizable size, it becomes possible to inform the user of which character is unrecognizable by displaying the character that is less than the recognizable size separately from the other characters. Consequently, the user is allowed to judge whether or not the unrecognizable character is a character that has to be recognized by the user.

As described above, in the above-mentioned processes of the present embodiment, the user can confirm recognizable characters among a plurality of character types with respect to a character image to be recognized. Therefore, it is possible to provide a character recognition device by which the user can confirm whether or not a character that needs to be recognized is recognizable among characters contained in a character image that has been read as a guidance for recognition, prior to carrying out a character recognition. Consequently, the user can easily judge whether or not a character image to be recognized by the user is recognizable without the need for waiting for the result of recognition.

EMBODIMENT 3

Figure 16:
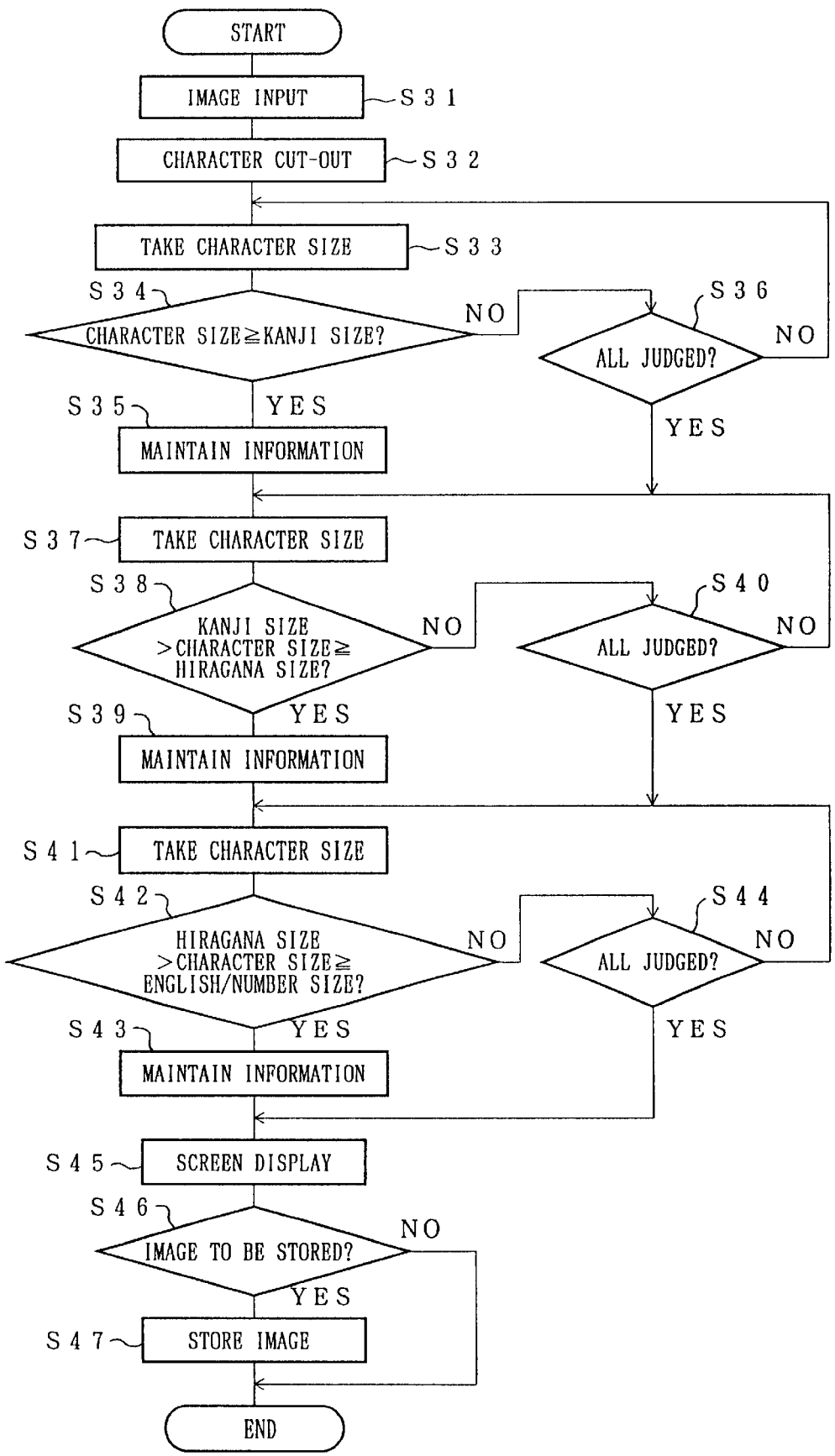
FIG. 16 is a flow chart that shows the sequence of processes prior to character recognition in a character recognition device in accordance with still another embodiment of the present invention.

Referring to FIGS. 1 and 2(*a*), 2(*b*) as well as FIGS. 15 and 16, the following description will discuss still another embodiment of the present invention. Here, for convenience of explanation, those of the members described in Embodiment 1 are indicated by the same reference numerals and the description thereof is omitted. In this embodiment, an explanation will be mainly given of distinctions over Embodiment 1 and Embodiment 2.

In the character recognition device of the present embodiment, the size judgment means 15 (character-size comparison/judgment means) compares the sizes of characters that have been cut out by the character cut-out section 14 (character cut-out means) with at least one of the character sizes stored in the size storage section 16 (character-size storage section), and based on the results of comparison, a character having one of the recognizable sizes related to the character types (that is, a character having the recognizable size of English/number, Hiragana or Kanji character) is selected (extracted). Then, the selected (extracted) character is informed together with information indicating the recognizable size (for example, together with a character or a symbol representing the recognizable character type or the largest recognizable character type).

An explanation will be given of an example in which: the size judgment section 15 makes a judgment as to which recognizable size of the character types, English/number, Hiragana/Katakana or Kanji, the sizes of the characters that have been cut out by the character cut-out section 14 correspond to, based upon the character sizes stored in the size storage section 16 so that a character having one of the recognizable sizes related to the character types is selected for each character type from the characters that have been read (cut out), and each of the selected characters is informed together with information representing the recognizable size as a sample for confirming the size required for recognition of a character to be recognized.

In other words, in the present embodiment, the size judgment section 15 also functions as a selection means for selecting a character having one of the recognizable sizes related to the character types that have been stored in the size storage section 16.

Referring to FIGS. 1, 2(*a*), 2(*b*) and 15, an explanation will be given of preliminary processes before character recognition is carried out by using the character recognition device of the present embodiment.

Upon carrying out character recognition by using the character recognition device, first the user turns power on using the power switch 5, directs the CCD camera section 6 toward a subject whose image is to be picked up, and pushes the image-taking key 3 once. Then, a character image including characters is picked up (photographed) by the CCD camera section 6. First, light, which has been converged by the lens section 8, is desirably enlarged by the zoom mechanism section 9, and projected onto the image pick-up surface section of the CCD 10. Next, the CCD 10 photoelectrically transfers the light projected by the lens section 8 through the zoom mechanism section 9 so that it is transferred to an analog signal (image signal) as an electric signal. The analog signal is amplified by an amplifier 11, and outputted to an A/D converter 12. The image signal, which has been converted into a digital signal by the A/D converter 12, is temporarily stored in a one-frame storage section 13, and outputted to a character cut-out section 14, and also displayed on the display section 2 as an image through a combining section 17.

In the character cut-out section 14, character display areas among the character image displayed on the display section 2 are successively cut out as character information, and this is outputted to the size judgment section 15.

In the present embodiment, the size judgment section 15 compares the size of a character that has been cut out by the character cut-out section 14 with the Kanji size, Hiragana size and English/number size that have been preliminarily stored in the size storage section 16 so that it successively detects a character having each of the sizes of the largest recognizable character types of Kanji, Hiragana, and English/number characters from the characters that have been read (cut out).

For example, in a character image as shown in FIG. 15, supposing that characters are cut out from the upper left by the character cut-out section 14, the size judgment section 15 first finds a character display area 27 in which "名" is displayed as a character having a recognizable size on the Kanji character basis (that is, a character having a size in which the largest recognizable character type is Kanji). Next, it finds a character display area 28 in which "登" is displayed as a character having a recognizable size on the Hiragana/Katakana character basis (that is, a character having a size in which the largest recognizable character type is Hiragana), except for characters having the Kanji size. Then, at last, it finds a character display area 29 in which "藷" is displayed as a character having a recognizable size on the English/number character basis (that is, a character having a size in which the largest recognizable character type is English/number), except for characters having the Kanji and Hiragana sizes.

At this point, the size judgment section 15 outputs to the combining section 17 (character-modification means) the information that the selected characters are characters representing the corresponding character sizes through a control line on the OK side.

Then, the combining section 17 places frames representing the sizes that have been preliminarily stored in the English/number size storage section 16a, the Hiragana size storage section 16b and the Kanji size storage section 16c as corresponding recognizable size frames 6 around the selected characters. Further, the combining section 17 places character information representing the recognizable size on a predetermined position of each of the recognizable size frames (for example, on an upper portion of the recognizable size frame), thereby displaying it on the display section 2 in combination with the characters that have been cut out. In the combining section 17, this process is carried out on one character for each character type (for each of the recognizable sizes of the character types).

In other words, in the aforementioned Embodiment 2, the sizes of characters that have been cut out are compared with a plurality of character sizes corresponding to the respective character types, and the resulting information is informed with respect to each of the characters that have been cut out. In contrast, in the present embodiment, the sizes of characters that have been cut out are successively compared with a plurality of character sizes corresponding to the respective character types, and a character having the recognizable size of each of the character types is selected so that information representing the result of the comparison is informed with respect to each selected character.

Therefore, based upon the characters that have been selected in accordance with the three types of recognizable character sizes and information indicating the recognizable size (for example, each display representing the largest recognizable character type) displayed on the upper portion of the recognizable size frame that is placed around each of the characters, the user can confirm the recognizable size for each character type that is required to recognize each of the characters that have been cut out.

Consequently, if the user compares the type of a character that has been selected with information placed next to the selected character so as to indicate the recognizable size, and thinks characters to be recognized are sufficiently large so as to be recognized, he presses the storage-specifying key 4 so that the character image of the one-frame storage section 13, displayed on the display section 2, is stored in the storage section 18.

Referring to a flow chart in FIG. 16, an explanation will be given of one example of these processes.

First, when the user presses the image-taking key 3, the control section 22 reads a character image related to the pressing of the image-taking key 3 by the user by using the CCD camera section 6 (an image input) (S31), and the character cut-out section 14 successively cuts out characters (character display areas) from the character image that has been read (S32).

Next, the control section 22 picks up the size of one of the characters that have been cut out (S33), and the size judgment section 15 compares the size of the character thus picked up with the Kanji size preliminarily stored in the Kanji-size storage section 16a of the size storage section 16. Then, a judgment is made as to whether or not there is any character among the cut-out characters that has a size recognizable on the Kanji character basis by judging whether or not the size of the character picked up is not less than the Kanji size (S34)

In this case, if the size of the character that has been picked up is the same as or larger than the Kanji size, the control section 22 makes a judgment that the size of the character that has been picked up into the size recognition section 15 has a size recognizable on the Kanji character basis, and maintains (stores, for example, in the buffer storage section 32) the information of the character that has been picked up together with the information that the character that has been picked up has a size recognizable on the Kanji character basis so that it selects (extracts) a character having a size recognizable on the Kanji character basis (that is, a size in which the largest recognizable character type is Kanji) (S35).

Here, if the size of the character that has been picked up is smaller than the Kanji size at S34, the control section 22 checks out whether or not judgments as to whether or not there is any character that has a size recognizable on the Kanji character basis have been made with respect to all the characters in the character image that has been read (S36).

In this case, if the above-mentioned judgments have not been finished with respect to all the characters in the character image that has been read (cut out), the sequence returns to S33, and the processes from S33 to S36 are repeated until any character that is recognizable on the Kanji character basis is found or until the above-mentioned judgments have been finished with respect to all the characters in the character image that has been read (cut out).

After any character having the Kanji size has been found, or after judgments as to whether or not there is any character that has a size recognizable on the Kanji character basis have been made with respect to all the characters in the character image that has been read (cut out), the size of a character other than the selected character is successively picked up (S37). Then, the size judgment section 15 compares the size of the character thus picked up with the Hiragana size preliminarily stored in the Hiragana-size storage section 16b as well as with the Kanji size preliminarily stored in the Kanji-size storage section 16a of the size storage section 16. Thus, a judgment is made as to whether or not the size of the character that has been picked up is smaller than the Kanji size, but greater than the Hiragana size, so that a judgment is made as to whether or not there is any character having the Hiragana size among the characters that have been cut out except for the character(s) having the Kanji size. (S38)

In this case, if the size of the character that has been picked up is smaller than the Kanji size, but the same as or larger than the Hiragana size, the control section 22 makes a judgment that the size of the character that has been picked up into the size recognition section 15 has a size in which the largest recognizable character type is Hiragana, and maintains (stores, for example, in the buffer storage section 32) the information of the character that has been picked up together with the information that the character that has been picked up has a size in which the largest recognizable character type is Hiragana so that it selects (extracts) a character having a size in which the largest recognizable character type is Hiragana (S39).

Here, if the size of the character that has been picked up is not less than the Kanji size, or smaller than the Hiragana size at S38, the control section 22 checks out whether or not judgments as to whether or not there is any character that has a size in which the largest recognizable character type is Hiragana have been made with respect to all the characters in the character image that has been read (S40).

In this case, if the above-mentioned judgments have not been finished with respect to all the characters in the character image that has been read (cut out), the sequence returns to S37, and the processes from S37 to S40 are repeated until any character having the Hiragana size is found or until the above-mentioned judgments have been finished with respect to all the characters in the character image that has been read (cut out).

After any character having the Hiragana size has been found, or after judgments as to whether or not there is any character that has a size in which the largest recognizable character type is Hiragana have been made with respect to all the characters in the character image that has been read (cut out), the size of a character other than the selected character is successively picked up (S41). Then, the size judgment section 15 compares the size of the character thus picked up with the English/number size preliminarily stored in the English/number-size storage section 16c as well as with the Hiragana size preliminarily stored in the Hiragana-size storage section 16b of the size storage section 16. Thus, a judgment is made as to whether or not the size of the character that has been picked up is smaller than the Hiragana size, but greater than the English/number size, so that a judgment is made as to whether or not there is any character having the English/number size among the characters that have been cut out except for the character(s) having the Kanji size and the Hiragana size (S42).

In this case, if the size of the character that has been picked up is smaller than the Hiragana size, but the same as or larger than the English/number size, the control section 22 makes a judgment that the size of the character that has been picked up into the size recognition section 15 has a size recognizable on the English/number character basis, and maintains (stores, for example, in the buffer storage section 32) the information of the character that has been picked up together with the information that the character that has been picked up has a size recognizable on the English/number character basis so that it selects a character having a size recognizable on the English/number character basis (that is a size in which the largest recognizable character type is English/number) (S43).

Here, if the size of the character that has been picked up is not less than the Hiragana, or smaller than the English/number size at S38, the control section 22 checks out whether or not the above-mentioned judgments have been made with respect to all the characters in the character image that has been read (cut out) (S44).

In this case, if the above-mentioned judgments have not been finished with respect to all the characters in the character image that has been read (cut out), the sequence returns to S41, and the processes from S41 to S44 are repeated until any character having the English/number size is found or until the above -mentioned judgments have been finished with respect to all the characters in the character image that has been read (cut out).

After any character having the English/number size has been found, or after judgments as to whether or not there is any character that has a size in which the largest recognizable character type is English/number have been made with respect to all the characters in the character image that has been read (cut out), a screen display is provided so that, based upon the information maintained in the processes at S35, S39 and S43, each of the selected (extracted) characters (that is, typical characters having the respective recognizable sizes) is shown with, for example, a character or a symbol indicating the largest recognizable character type being located in the vicinity thereof (at a predetermined position on the recognizable-size frame) as information for indicating the recognizable size (S45).

In this case, with respect to characters whose information has not been stored at any of the processes of S35, S39 and S43, neither recognizable-size frame nor recognizable size is displayed.

Successively, the user is allowed to judge whether or not the character image that has been read is stored (S46), and if the user specifies that the character image be stored, the character image that has been read is stored in the storage section 18 in accordance with a signal inputted through the storage-specifying key 4 (S47).

In the above-mentioned explanation, the character image, stored in the storage section 18, is later compared with data stored in the recognizing data section 20 in the recognizing section 19 by the control section 22 so that it is subjected to a character-recognizing process. Then, the result of the recognition is replaced by the character image and displayed on the display section 2.

Additionally, in the above-mentioned explanation, each of the character sizes is picked up at each of the processes S33, S37 and S41; however, the information that has been read once may be maintained so as to reduce the number of pick-up operations related to the respective sizes.

Further, upon picking up the size of a character at S37 and S41, the pick-up process may be carried out with respect to characters starting with the next character to the one that was previously picked up. In this case, all the screen has to be detected until the character in question has been found.

Moreover, in the above-mentioned explanation, among characters that have been read (cut out), each character having a size in which the largest recognizable character type is Kanj i, Hiragana or English/number is successively detected in this order; however, characters having sizes corresponding to the Kanji size, Hiragana size and English/number size may be extracted by checking out whether or not the sizes of the characters that have been cut out are coincident with the respective character sizes preliminarily stored in the size-storage section 16. Furthermore, in the above-mentioned explanation, in accordance with the signal inputted through the storage-specifying key 4, the character image that has been read is stored in the storage section 18, and then the recognition is carried out based upon the stored information; however, for example, the recognizable-size information may be outputted to the recognizing section 19 from the size judgment section 15 through the size storage section 16. Thus, by comparing this information and the information stored in the one-frame storage section 13 with the data stored in the recognizing data section 20, a preliminary recognition may be carried out on the characters that have been cut out so that a judgment as to whether or not recognition is available can be made by displaying the result of the preliminary recognition on the display section 2.

As described above, with the above-mentioned processes in the present embodiment, in a character image to be recognized, only the typical characters having the recognizable sizes corresponding to the character types are allowed to have displays related to their recognizable sizes.

The present embodiment makes it possible to provide a character recognition device by which the user can confirm whether or not a character that needs to be recognized is recognizable among characters contained in a character image that has been read as a guidance for recognition, prior to carrying out a character recognition.

For this reason, with the above-mentioned character recognition device, the user can easily make a judgment as to whether or not a character image to be recognized is recognizable without the need for waiting for the result of the recognition.

EMBODIMENT 4

Figure 18:
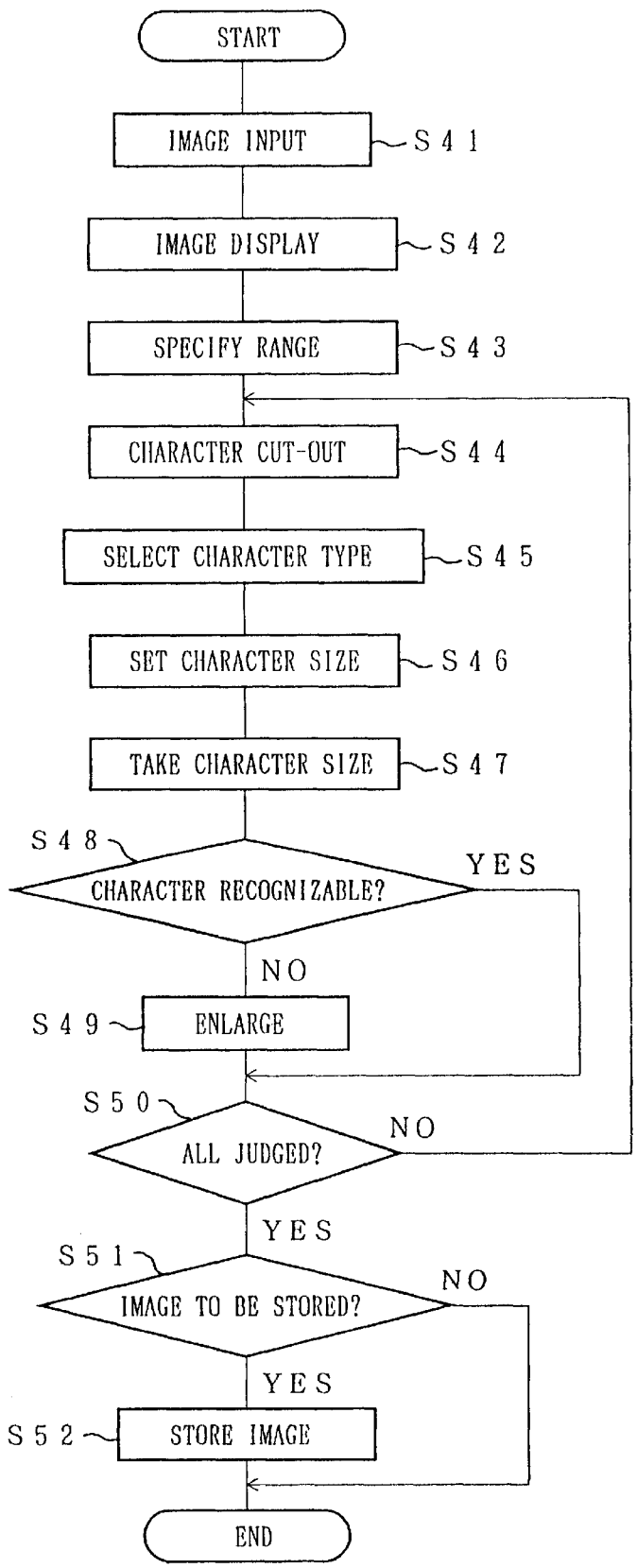
FIG. 18 is a flow chart that shows the sequence of processes prior to character recognition in a character recognition device in accordance with still another embodiment of the present invention.

Referring to FIGS. 1, 2(a) and 2(b) as well as FIGS. 17 and 18, the following description will discuss still another embodiment of the present invention. Here, for convenience of explanation, those of the members described in Embodiment 1 are indicated by the same reference numerals and the description thereof is omitted. In this embodiment, an explanation will be mainly given of distinctions over Embodiment 1.

In the character recognition device of the present embodiment, the size judgment means 15 (character-size comparison/judgment means) compares the size of a character that has been cut out by the character cut-out section 14 (character cut-out means) with a reference character size stored in the size storage section 16 (character-size storage section) so that it makes a judgment as to whether or not the size of the character that has been cut out is recognizable. If the size judgment means 15 makes a judgment that the size of the character that has been cut out is less than a recognizable size, the character that has been cut out is enlarged to the recognizable size by the zoom mechanism section 9 (enlarging means) based upon the results of comparison/judgment in the size judgment means 15.

Therefore, in the present embodiment, information of the character enlarged by the zoom mechanism section 9 is displayed on the display section 2, thereby informing the user of the information.

In the present embodiment, the size judgment section 15 also functions as a character-size judgment means for making a judgment as to whether or not the size of the character that has been cut out is recognizable.

Referring to FIGS. 1, 2(a) and 2(b) as well as FIGS. 17(a) and 17(b), an explanation will be given of preliminary processes before character recognition is carried out by using the character recognition device of the present embodiment.

Upon carrying out character recognition by using the character recognition device, first the user turns power on using the power switch 5, directs the CCD camera section 6 toward a subject whose image is to be picked up, and pushes the image-taking key 3 once. Then, a character image including characters is picked up (photographed) by the CCD camera section 6. First, light, which has been converged by the lens section 8, is desirably enlarged by the zoom mechanism section 9, and projected onto the image pick-up surface section of the CCD 10. Next, the CCD 10 photoelectrically transfers the light projected by the lens section 8 through the zoom mechanism section 9 so that it is transferred to an analog signal (image signal) as an electric signal. The analog signal is amplified by an amplifier 11, and outputted to an A/D converter 12. The image signal, which has been converted into a digital signal by the A/D converter 12, is temporarily stored in a one-frame storage section 13, and outputted to a character cut-out section 14, and also displayed on the display section 2 as an image.

The character cut-out section 14 cuts out a character display area in the character image displayed on the display section 2, and outputs it to the size judgment section 15 (judgment means). The size judgment section 15 compares the size of the character that has been cut out by the character cut-out section 14 with the reference character size that has been preliminarily stored in the size storage section 16 (storage means) (for example, the Kanji size, or the reference character size that was specified by the user among the English/number size, the Hiragana size and the Kanji size), and makes a judgment as to whether or not the size of the character that has been cut out by the character cut-out section 14 is recognizable. As a result, if the size of the character that has been cut out is larger than or the same as the reference character size, it outputs information of the character that has been cut out by the character cut-out section 14 to the display section 2 through the combining section 17 by using a control line on the OK side.

In the present embodiment, as a result of the comparison in the size judgment section 15 between the reference character size and the size of the character that has been cut out by the character cut-out section 14, if the reference character size is larger than the size of the character that has been cut out, an enlargement-requesting signal is outputted from a switch section 25, which will be described later, through a control line on the NG side.

Further, in the size judgment section 15, the magnification by which the character that has been cut out is enlarged to the reference character size is calculated. Then, the magnification signal is outputted from the size judgment section 15 to a mode-specifying section 24, thereby allowing the switch section 25 to conduct. The switch section 25 controls power supply to a motor 26 for driving the zoom mechanism section 9. Therefore, when the switch 25 is turned on by the signal from the mode-specifying section 24, the motor section 26 drives the zoom mechanism section 9 so as to enlarge the image that is to be read through the lens section 8, with the result that a recognizing operation is carried out by using the character size that has been specified by the user. A specific example of this arrangement is shown as follows:

FIGS. 17(a) and 17(b) show examples of the display screen of the character recognition device of the present embodiment.

Assume now that the user uses the image-reading key 3 to specify a region of a portion of a character image on the tablet section 2b of the display section 2 with the character image being displayed thereon. As illustrated in FIG. 17(a), if he or she specifies a region 30 showing "登録特許1234567", the character cut-out section 14 starts cutting out characters in the region 30.

Next, if the reference character size preliminarily stored in the size storage section 16 is the Kanji size, the size judgment section 15 compares the size of the cut-out character with the Kanji character size. In this case, since the size of the cut-out character is smaller than the Kanji character size, the zoom mechanism section 9 is driven so as to enlarge the target character image as illustrated in FIG. 17(b).

When the user presses the storage-specifying key 4 after having confirmed the enlarged character, the switching section 23 outputs a signal to the control section 22 so that the character image of the one-frame storage section 13, displayed on the display section 2, is stored in the storage section 18.

In the above-mentioned example, the reference character size, which is a character size used for comparison, is set as the Kanji size; however, when the user is allowed to preferably set the reference character size, the target character image (that is, the character cut out by the character cut-out section 14) may be enlarged to the character size that has been set by the user.

In other words, in the aforementioned embodiment 1, if the size of a cut-out character is not the recognizable size, this fact (the information that the cut-out character is not recognizable) is informed; however, in the present embodiment, if the size of a cut-out character is not the recognizable size, the cut-out character is enlarged to the reference character size (that is, the recognizable size) that has been preliminarily set and stored.

Referring to a flow chart shown in FIG. 18, the following description will discuss one example of the above-mentioned processes.

First, when the user presses the image-taking key 3, the control section 22 reads a character image related to the pressing of the image-taking key 3 by the user by using the CCD camera section 6 (an image input) (S41), and displays the character image that has been read on the display section 2 (S42). Next, when the user specifies a region that he or she desires to recognize on the screen in the display section 2 by using the tablet section 26, etc., installed on the screen (S43), the control section 22 allows the character cut-out section 14 to successively cut out characters from the character image within the specified region (S44).

Successively, when the user, after having selected the type of characters that have been cut out, inputs the selected type of character through the input means such as a switching section 23 (S45), the control section 22 sets and stores the character size that allows recognition of the selected character type in the size storage section 16 as the reference character size (S46).

Next, the control section 22 picks up the size of a character that has been first cut out (S47), and the size judgment section 15 compares the size of the character that has been picked up with the reference character size (that is, the size set at S46) stored in the size storage section 16. Then, a judgment is made as to whether or not the character is recognizable by judging whether or not the size of the character picked up is a recognizable size (S48).

In this case, when the size of the character picked up is smaller than the reference character size, the control section 22 allows the size judgment section 15 to make a judgment that the character that has been picked up is recognizable, and successively, outputs the enlargement-requesting signal to a switching section 25 so that the switching section 25 is turned on through the mode-specifying section 24. Thus, the character image to be read is picked up so that the characters to be recognized have the recognizable size by allowing the zoom mechanism section 29 to be driven by the motor section 26 (S49).

Successively, the control section 22 checks out whether or not judgments as to recognition have been carried out on all the characters that have been cut out (S50).

If judgments as to recognition have not been made on all the characters that were read, the sequence returns to S44, and the next character to the one whose size is taken at S47 is cut out. Then, the processes S44 through S50 are repeated until judgments as to recognition have been finished on all the characters that were cut out.

Further, at S48, if the size of the character that has been picked up is larger than or the same as the reference character size, the control section 22 makes a judgment that the character is recognizable, and the sequence proceeds to S50.

After judgments as to recognition have been made on all the characters that have been cut out, the user is allowed to judge whether or not the character image that has been read is stored (S51), and if the user specifies that the character image be stored, the character image that has been read is stored in the storage section 18 in accordance with a signal inputted from the storage-specifying key 4 (S52).

The character image, stored in the storage section 18 in the above-mentioned explanation, is later subjected to a character recognition by being compared with data stored in the recognizing data section 20 which is controlled by the control section 22. The result of the recognition is replaced by the character image, and displayed on the display section 2.

As described above, with the above-mentioned processes of the present embodiment, if a character that the user desires to recognize is unrecognizable in its read state, the magnification by which the size of this character is enlarged to the reference character size is calculated, and a re-reading operation is carried out in accordance with the magnification signal so that the character to be recognized is automatically enlarged to the recognizable size desired by the user merely by carrying out the re-reading operation once.

Therefore, the present embodiment makes it possible to provide a character recognition device by which the user can confirm whether or not a character that needs to be recognized is recognizable among characters contained in a character image that has been read as a guidance for recognition, prior to carrying out a character recognition and in which, if the character that needs to be recognized by the user does not have a recognizable size, the character is automatically enlarged to the recognizable size.

Additionally, in each of the above-mentioned embodiments, with respect to sections required for recognition such as a character cut-out operation, the above-mentioned character cut-out section 14 is commonly used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A character recognition device, which is a character recognition device for recognizing characters in a character image that has been picked up by an image pick-up means and stored in a storage means by using a recognizing means, the device comprising:

character cut-out means for cutting out a character from the character image that has been picked up by the image pick-up means at a time of pick-up by said image pick-up means;

character-size storing means for storing at least one character size among character sizes used for making a recognition process operable, each of which is set for each of character types that can be recognized by the recognizing means;

character-size comparison/judgment means for comparing the size of the character that has been cut out by the character cut-out means with at least one recognizable character out of a plurality of different character sizes stored in the character size storing means, the one recognizable character being of a size in accordance with a type of character that has been cut out, wherein said comparing is carried out at the time of pick-up and prior to a recognition process to be performed by the recognizing means;

means for determining whether or not to initiate the recognition process based at least in part upon whether the size of the cut-out character is determined to be sufficient; and informing means for informing as a guidance for recognition information corresponding to results obtained by comparing the size of the character that has been cut out by the character cut-out means with at least one of character sizes that have been stored in the character-size storing means by using the character-size comparison/judgment means, so as to enable a judgment as to whether or not the character in the picked-up character image is recognizable prior to the recognition process at the time of image pick-up.

2. The character recognition device as defined in claim 1, wherein: the character-size comparison/judgment means makes a judgment as to whether or not the size of the cut-out character is a recognizable size based upon the results of comparison between the size of the character that has been cut out by the character cut-out means and at least one of character sizes that have been stored in the character-size storing means, and if the size-judging means makes a judgment that the size of the cut-out character is less than the recognizable size, the informing means informs the user of the fact that it is not recognizable.

3. The character recognition device as defined in claim 1, wherein: the character-size comparison/judgment means makes a judgment as to what type of character the cut-out character should be so as to become recognizable size based upon the results of comparison between the size of the character that has been cut out by the character cut-out means and a plurality of character sizes that have been stored in the character-size storing means, and the informing means informs the user of the recognizable type of character that has been judged by the character-size comparison/judgment means.

4. The character recognition device as set forth in claim 3, further comprising:

character-modification means for modifying the character that has been cut out by the character cut-out means based upon the results of judgment made by the character-size comparison/judgment means, wherein the character-modification means adds a modification corresponding to the recognizable type of character that has been judged by the character-size comparison/judgment means to the character that has been cut out by the character cut-out means.

5. The character recognition device as defined in claim 1, wherein: the character-size comparison/judgment means selects a character having a recognizable size corresponding to one of the character types based upon the results of comparison between the size of the character that has been cut out by the character cut-out means and at least one of character sizes that have been stored in the character-size storing means, and the informing means informs the user of the character that has been selected by the character-size comparison/judgment means together with information indicating the recognizable size.

6. The character recognition device as set forth in claim 5, further comprising:

character-modification means for modifying the character that has been selected based upon the results of judgment made by the character-size comparison/judgment means, wherein the character-modification means adds a modification corresponding to the recognizable size to the selected character.

7. The character recognition device as defined in claim 1, further comprising:

enlarging means for enlarging the character image that has been picked up, wherein: the character-size comparison/judgment means makes a judgment as to whether or not the size of the cut-out character is a recognizable size based upon the results of comparison between the size of the character that has been cut out by the character cut-out means and at least one of character sizes that have been stored in the character-size storing means; if the character-size comparison/judgment means makes a judgment that the size of the cut-out character is less than the recognizable size, the enlarging means enlarges said character to the recognizable size; and the informing means informs information on the character that has been enlarged by the enlarging means.

8. The character recognition device as defined in claim 7, wherein the character sizes, which are stored in the character-size storing means so as to be compared with the size of the character that has been cut out by the character-size comparison/judgment means, are standard character sizes that are set based on types of characters used as targets for recognition.

9. A method of recognizing characters in a character image which has been picked up by an image pick-up device, the method comprising the following steps:

storing at least one character size in a memory for subsequent comparison purposes;

picking up the character image using an image pick-up device;

cutting out a character from the picked up character image;

following said storing and picking up steps, comparing a size of the picked up character with the character size stored in the memory at a point in time prior to initiation of a recognition process based upon the cut-out character;

determining, based upon results of said comparing step, whether the size of the cut-out character is sufficient so that the cut-out character will be recognizable;

determining whether or not to initiate a recognition process based at least in part upon whether the size of the cut-out character is determined to be sufficient;

initiating the recognition process in order to recognize the cut-out character following completion of said comparing and determining steps when it has been determined that the cut-out character is of sufficient size, and not initiating the recognition process in order to recognize the cut-out character when it has been determined that the cut-out character is not of sufficient size.

10. The method of claim 9, further comprising the step of informing a user of the results of at least one of said comparing step and said determining step, so that the user is informed as to whether or not the cut-out character is of a size sufficient for recognition.

11. A device for recognizing characters in a character image which has been picked up by an image pick-up device, the device comprising:

a memory for storing at least one character size for subsequent comparison purposes;

an image pick-up device for picking up the character image;

a cut-out function for cutting out a character from the picked up character image;

a comparator for comparing a size of the picked up character with the character size stored in the memory, following said storing and picking up steps, at a point in time prior to initiation of a recognition process based upon the cut-out character;

a determining function for determining, based upon results of said comparing step, whether the size of the cut-out character is sufficient so that the cut-out character will be recognizable, and for determining whether or not to initiate a recognition process based at least in part upon whether the size of the cut-out character is determined to be sufficient; and a recognizing function for initiating the recognition process in order to recognize the cut-out character following completion of said comparing and determining functions, when it has been determined that the size of the cut-out character is sufficient.

12. The device of claim 11, wherein said comparator is for comparing the size of the character that has been cut out by the cut-out function with one of a plurality of character sizes stored in memory, said one character size being selected in accordance with a type of character cut out by said cut-out function.

13. The device of claim 1, wherein said character types comprise a plurality of different character types including Kanji characters, Hiragana characters, and English characters, and a character size required for recognizing each of said character types is set for each of said plurality of character types.

14. The device of claim 11, wherein said memory stores a different character size required for recognizing each of a plurality of different character types, said different character types including Kanji characters, Hiragana characters, and English characters.

15. The device of claim 1, wherein said means for determining whether or not to initiate the recognition process decides whether or not to initiate the recognition process based on the result of comparison by said character/size comparison/judgment means prior to said recognition process indicative of whether the cut-out character satisfies the character size used for making the recognition process operable set for each of character types that can be recognized.

* * * * *